United States Patent
Vetzler et al.

(10) Patent No.: US 12,530,585 B1
(45) Date of Patent: Jan. 20, 2026

(54) MODEL MERGING VIA RIEMANNIAN BARYCENTERS OF HIGH-DIMENSIONAL TRANSFORMER WEIGHTS

(71) Applicant: Intuit Inc., Mountain View, CA (US)

(72) Inventors: Matan Vetzler, Ramat Gan (IL); Shai Ardazi, Petach Tikva (IL); Linoy Cohen, Ramat Gan (IL); Guy Lev, Giv'atayim (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/194,875

(22) Filed: Apr. 30, 2025

(51) Int. Cl.
  *G06N 3/082* (2023.01)
  *G06N 3/0455* (2023.01)
(52) U.S. Cl.
  CPC ........... *G06N 3/082* (2013.01); *G06N 3/0455* (2023.01)
(58) Field of Classification Search
  CPC ............................. G06N 3/082; G06N 3/0455
  See application file for complete search history.

(56) References Cited

U.S. PATENT DOCUMENTS

| | | | | |
|---|---|---|---|---|
| 11,921,824 | B1* | 3/2024 | Hester | G06N 3/045 |
| 2008/0063285 | A1* | 3/2008 | Porikli | G06V 10/50 |
| | | | | 382/190 |
| 2021/0209513 | A1* | 7/2021 | Torres | G06N 20/00 |
| 2021/0256538 | A1* | 8/2021 | Butvinik | G06N 20/00 |
| 2021/0350620 | A1* | 11/2021 | Bronstein | G06N 20/00 |
| 2022/0391673 | A1* | 12/2022 | Thomson | G06N 3/045 |
| 2023/0306761 | A1* | 9/2023 | Sirbulescu | G06V 10/12 |
| 2024/0355472 | A1* | 10/2024 | Criekinge | G16H 50/30 |
| 2025/0022540 | A1* | 1/2025 | Essam | G16B 40/20 |
| 2025/0124105 | A1* | 4/2025 | Jha | G06F 17/16 |
| 2025/0156684 | A1* | 5/2025 | Liu | G06N 3/0455 |

OTHER PUBLICATIONS

Linear Interpolation. URL: https://en.wikipedia.org/wiki/Linear_interpolation (accessed Apr. 30, 2025).
Slerp. URL: https://en.wikipedia.org/wiki/Slerp (accessed Apr. 30, 2025).
Ensemble Learning. URL: https://en.wikipedia.org/wiki/Ensemble_learning (accessed Apr. 30, 2025).

* cited by examiner

*Primary Examiner* — Oluwatosin Alabi
(74) *Attorney, Agent, or Firm* — Dinsmore & Shohl LLP

(57) ABSTRACT

Certain aspects provide a method for merging multiple transformer models. The method includes obtaining a first weight matrix and a second weight matrix, the first weight matrix comprising a first layer of parameters of a first transformer model, the second weight matrix comprising a second layer of parameters of a second transformer model; mapping the first weight matrix to a first point on a curved manifold; mapping the second weight matrix to a second point on the curved manifold; generating a first optimized weight matrix based on a first manifold-constrained optimization of the first point and the second point on the curved manifold; and generating a first merged transformer model of the first transformer model and the second transformer model by mapping the first optimized weight matrix to a first merged layer of parameters of the first merged transformer model.

20 Claims, 11 Drawing Sheets

900

Obtain a first weight matrix and a second weight matrix, the first weight matrix comprising a first layer of parameters of a first transformer model, the second weight matrix comprising a second layer of parameters of a second transformer model, the first transformer model and the second transformer model comprising a same number of layers and a same number of parameters, the first layer and the second layer associated with a same layer index
902

Map the first weight matrix to a first point on a curved manifold
904

Map the second weight matrix to a second point on the curved manifold
906

Generate a first optimized weight matrix based on a first manifold-constrained optimization of the first point and the second point on the curved manifold by determining a first merge point on a first tangent space of the curved manifold that minimizes a first total distance from the first merge point to the first point and the second point, wherein the first merge point corresponds to the first optimized weight matrix
908

Generate a first merged transformer model of the first transformer model and the second transformer model by mapping the first optimized weight matrix to a first merged layer of parameters of the first merged transformer model, the first merged layer associated with the same layer index
910

FIG. 9

MODEL MERGING VIA RIEMANNIAN BARYCENTERS OF HIGH-DIMENSIONAL TRANSFORMER WEIGHTS

BACKGROUND

Field

Aspects of the present disclosure relate to systems and methods for merging two or more machine learning models, such as two or more transformer models.

Description of Related Art

Generative artificial intelligence (GenAI) refers to machine learning models that are able to create new content based on patterns and information learned from training data in combination with a user prompt. The user prompt provides instruction to a model on what new content to generate and how to generate that new content. Notably, the model is able to generate new content based on both actual information (e.g., facts and knowledge) included in the training data, as well as patterns, insights, and model parameter weights learned from the training data.

GenAI models are able to generate new content in many different forms, including text, image, audio, and even video. For example, to facilitate text generation, some GenAI models are configured as language models (LMs). An LM is generally a type of machine learning model that is designed to understand, generate, and manipulate human language. More specifically, an LM is a probabilistic framework that determines the likelihood of a sequence of words or tokens (e.g., units of text, such as words, parts of words, characters, etc.). At its core, an LM attempts to predict the probability of the next word in a sentence given the preceding words. The LM estimates these probabilities based on the patterns it learned during training. LMs are useful in natural language processing (NLP) and computational linguistics for performing a range of tasks involving human language.

LMs have a wide array of applications, including: text generation (e.g., producing coherent and contextually appropriate text; machine translation (e.g., converting text from one language to another); speech recognition (e.g., converting spoken language into text); text summarization (e.g., condensing a long piece of text into a shorter summary); sentiment analysis (e.g., determining the sentiment expressed in a piece of text); and question answering (e.g., automatically providing answers to questions posed in natural language).

While LMs represent a transformative force in many industries by assimilating vast amounts of knowledge, these models are not without limitation. For example, while a powerful tool, a general-purpose LM may not be able to perform tasks related to generating specialized content that was not represented in the original training data or not enabled by its original configuration.

SUMMARY

One aspect provides a method for merging two or more transformer models. The method includes obtaining a first weight matrix and a second weight matrix, the first weight matrix comprising a first layer of parameters of a first transformer model, the second weight matrix comprising a second layer of parameters of a second transformer model, the first transformer model and the second transformer model comprising a same number of layers and a same number of parameters, the first layer and the second layer associated with a same layer index; mapping the first weight matrix to a first point on a curved manifold; mapping the second weight matrix to a second point on the curved manifold; generating a first optimized weight matrix based on a first manifold-constrained optimization of the first point and the second point on the curved manifold by determining a first merge point on a first tangent space of the curved manifold that minimizes a first total distance from the first merge point to the first point and the second point, wherein the first merge point corresponds to the first optimized weight matrix; and generating a first merged transformer model of the first transformer model and the second transformer model by mapping the first optimized weight matrix to a first merged layer of parameters of the first merged transformer model, the first merged layer associated with the same layer index.

Another aspect provides a method for merging two or more transformer models. The method includes obtaining a first weight matrix, a second weight matrix, and a third weight matrix, the first weight matrix comprising a first layer of parameters of a first transformer model, the second weight matrix comprising a second layer of parameters of a second transformer model, the third weight matrix comprising a third layer of parameters of a third transformer model, wherein the first transformer model, the second transformer model, and the third transformer model comprise a same number of layers and a same number of parameters, wherein the first layer, the second layer, and the third layer are associated with a same layer index; mapping the first weight matrix to a first point on a curved manifold; mapping the second weight matrix to a second point on the curved manifold; mapping the third weight matrix to a third point on the curved manifold; generating a first optimized weight matrix based on a first manifold-constrained optimization of the first point, the second point, and the third point on the curved manifold by determining a first merge point on a first tangent space of the curved manifold that minimizes a first total distance from the first merge point to the first point, the second point, and the third point, wherein the first merge point corresponds to the first optimized weight matrix; and generating a first merged transformer model of the first transformer model, the second transformer model, and the third transformer model by mapping the first optimized weight matrix to a first merged layer of parameters of the first merged transformer model, the first merged layer associated with the same layer index.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 9 depicts a method for merging transformer models.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
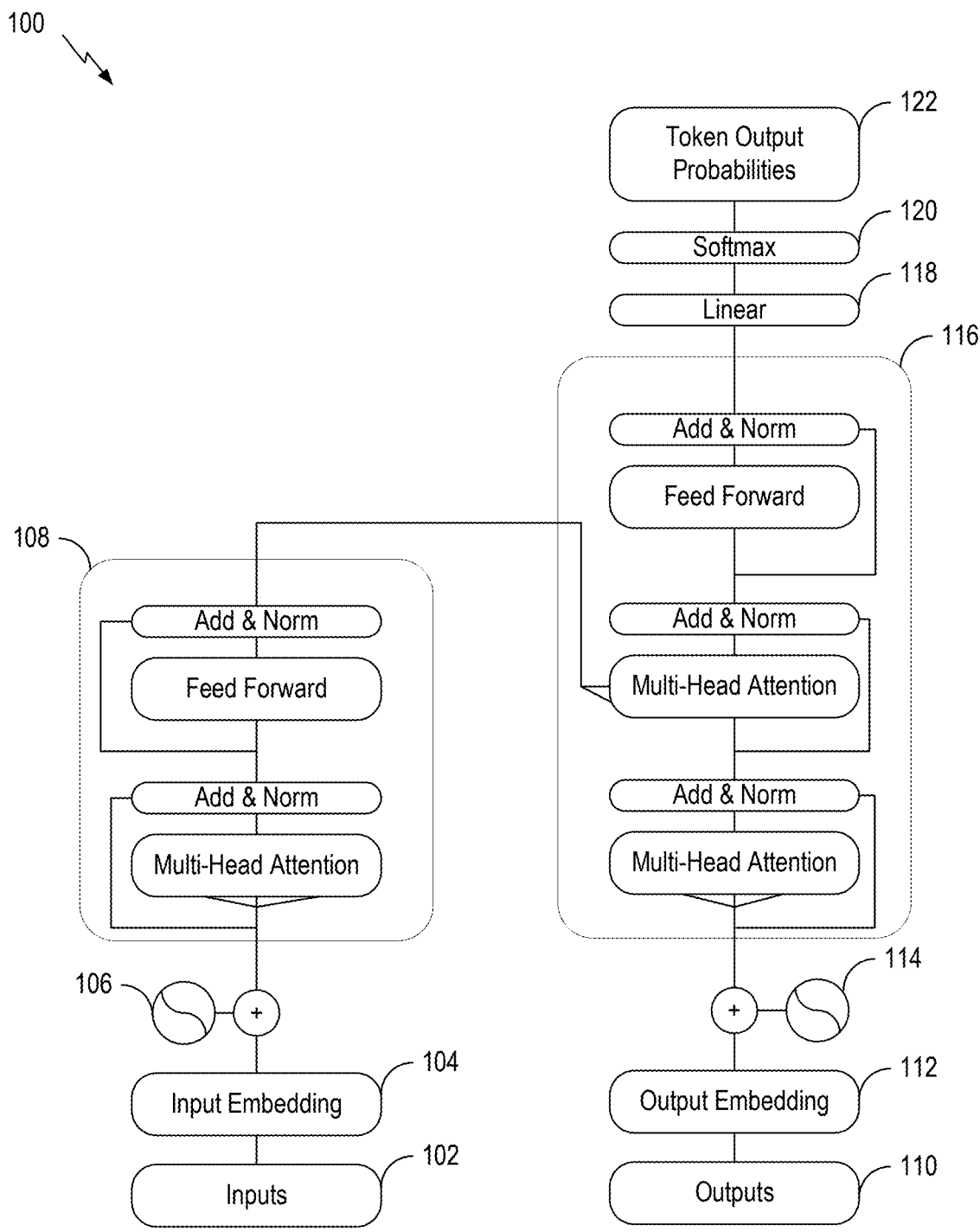
FIG. 1 depicts an example of a transformer model architecture.

Aspects of the present disclosure provide apparatuses, methods, processing systems, and computer-readable mediums for merging two or more machine learning models, such as two or more transformer models.

An LM is a type of machine learning model that is designed to understand, generate, and manipulate human language by predicting the next token in a token sequence based on previously predicted tokens. LMs may be implemented in various ways. For example, LMs may be implemented as N-gram models that predict the next word based on previous N−1 words. In some cases, LMs may be implemented as neural network-based LMs, such as Recurrent Neural Networks (RNNs), Long Short-Term Memory (LSTM) networks, and transformer models. These models capture more complex language patterns and context dependencies. For example, the transformer architecture of the transformer models, introduced with models like Bidirectional Encoder Representations from Transformers (BERT) and Generative Pre-trained Transformer (GPT), utilizes self-attention mechanisms to handle long-range dependencies potentially more effectively than RNNs or LSTM networks. An example transformer architecture of an LM is described in more detail with respect to FIG. 1.

LMs are often trained using large corpora of text. The training process involves adjusting the model's parameters to minimize the difference between its predicted word probabilities and the actual word sequences in the training data. This is typically done via techniques like maximum likelihood estimation and gradient descent.

Pre-training is the initial phase of training for generative LMs. Pre-training starts with an untrained model (e.g., a model that has randomly initialized parameter weights), and trains it to predict a next token given a sequence of previous tokens. In the context of LMs, tokens may be units of text that the models process and generate. Tokens can represent individual characters, words, subwords, or even larger linguistic units, depending on the specific tokenization approach used. Tokenization refers to the process of segmenting text into meaningful units to capture its semantic and syntactic structure. Tokens act as a bridge between the raw text data and the numerical representations that LMs are able to work with.

Training data used to pre-train an LM often includes publicly available "raw text," for example, from books, articles, websites, and/or the like. To be highly capable (e.g., have linguistic and world knowledge), this text may span a broad range of domains, genres, languages, etc. Eventually, by training on large amounts of text, the model learns to encode the structure of language in general (e.g., it learns, that "I like," for example, may be followed by a noun (e.g., patents) or a participle) as well as the knowledge included in the raw texts that the model was exposed to during training. For example, an LM may learn, that the text "George Washington was" is often followed by "the first president of the United States," and hence has a representation of that piece of knowledge.

Although a pre-trained LM is, due to the knowledge it encodes, able to perform a variety of tasks, the model may lack specific knowledge that is not encoded in the training data. For example, a general-purpose LM (e.g., off-the-shelf LM) pre-trained on publicly-available data may not be able to respond, or may respond incorrectly, to certain types of prompts, such as a prompt requesting that the LM generate an answer to a question related to a specific knowledge domain (e.g., tax code, accounting practice, etc.). For example, the pre-trained LM may not be able to respond, or may respond incorrectly, given the information that is requested is not part of the generally available training data used to pre-train the LM.

To address the shortcomings of general-purpose LMs, some LMs may be "fine-tuned" for specific knowledge domains (which may also be referred to, more generally, as domains). Fine-tuning LMs for specific domains involves adapting a pre-trained LM to generate domain-specific text and/or initiate or perform domain-specific tasks by training the pre-trained model on additional training datasets corresponding to the specific domain. This process allows the model to better understand and generate content that aligns with the particular domain and/or topic/area of interest. However, a fine-tuned LM that is trained on training datasets of one specific domain (e.g., tax code) may not be able to respond, or may respond incorrectly, to prompts requesting that the LM generate an answer to a question related to a different domain (e.g., accounting practice). For example, the training datasets used for fine-tuning the LM may not include examples of the type of requested output related to the different domain.

One approach to address the shortcomings of fine-tuned LMs in responding correctly to prompts requesting that the LM generate an answer to a question related to a different domain than the domain of training data on which the LM is trained (or related to more than one specific domain) is to use an "ensemble" of LMs. The ensemble of LMs uses multiple LMs to obtain better predictive performance than could be obtained from any one of such LMs alone. These LMs may be trained on training datasets of different domains. In one example, a prediction by the ensemble of LMs may be based on a voting of predictions performed by the individual LMs of the ensemble. While there are also other examples of prediction by an ensemble of LMs, the prediction by an ensemble of LMs generally includes predictions performed by the individual LMs of an ensemble. For example, a certain prediction by an ensemble of LMs may actually include multiple predictions performed by the individual LMs of the ensemble. Accordingly, technical problems for using an ensemble of LMs to generate a correct prediction (e.g., related to more than one domain) may include, for example, the extensive computational resources, such as used for predictions by the individual LMs.

Another approach to address the shortcomings of fine-tuned LMs in responding correctly to prompts requesting that the LM generate an answer to a question related to a different domain than the domain of training data on which the LM is trained (or to more than one specific domain) is to "merge" LMs (e.g., multiple LMs fine-tuned for different domains). Such merging of LMs includes merging of the fine-tuned parameter weights of the fine-tuned LMs. For example, some conventional methods of the merging of LMs may be based on naïve parameter averaging, Linear Interpolation (LERP), Spherical Linear Interpolation (SLERP), and geometric median of parameters. However, these conventional methods do not account for the high-dimensional and non-linear structure of the parameters of an LM-particularly, a transformer model having a transformer architecture (e.g., described herein with reference to FIG. 1). Parameter weights of a transformer model (which may also be referred to as transformer weights), especially in attention and feed forward layers, have non-trivial geometric properties due to, for example: (1) layer normalization and Softmax operations, which impose constraints on weight distributions; (2) low-rank structures emerging from training dynamics; and (3) scaling behaviors across different models and tasks. These properties suggest that transformer weights do not lie in a flat Euclidean space, but instead form a curved manifold, where distances and interpolations may be measured along geodesics (shortest paths on a curved surface). Thus, the conventional methods of merging of LMs, which do not account for these properties of transformer weights, typically result in suboptimal performance in prediction (e.g., in the accuracy in predicted output).

For example, naive parameter averaging (e.g., averaging of parameter weights of models) often results in suboptimal performance because transformer weight spaces are high-dimensional and non-linearly structured, and the parameter averaging does not account for the geometric properties of transformer weight spaces. This can result in destructive interference among the parameters (e.g., the fine-tuned or specialized parameters) of different transformer models. Similarly, LERP, SLERP, and geometric median do not sufficiently account for the properties of transformer weight spaces (e.g., by assuming Euclidean structure or oversimplifying weight space). Accordingly, technical problems for merging LMs using certain conventional methods may include the suboptimal performance in prediction.

Aspects described herein overcome the aforementioned technical problems, for example, by merging two or more machine learning models, such as two or more transformer models, using a manifold (e.g., a curved manifold) representation of the parameter weights of the models being merged. A curved manifold representation may refer to mapping a plurality of weights to points on the curved manifold. Certain aspects described herein use Riemannian barycenters of the parameter weights of the models being merged. A Riemannian barycenter on a curved manifold is a geometric mean that accounts for the curved spaces of the curved manifold, which minimizes the geodesic distances to a set of points on the curved manifold. For example, a model's weight matrix (e.g., a matrix of a plurality of parameter weights of a particular layer of the model) may be treated or represented as a point on a manifold (e.g., a curved manifold). The curved manifold is a generalization of a curved surface that is locally Euclidean—for example, the curved manifold resembles a Euclidean space in small regions while having global properties that deviate from Euclidean space.

For merging two models, a first model's weight matrix may be represented as a first point on the curved manifold, and a second model's weight matrix may be represented as a second point on the curved manifold. Geodesic distances to the first point and the second point may be used to find an optimal merge point (which may be referred to as a center point) that corresponds to a merged weight matrix of the first model's weight matrix and the second model's weight matrix. As the Riemannian barycenters (corresponding to the optimal merge point described above) respect the curved geometry of high-dimensional transformer weight spaces, a smooth and meaningful interpolation of two models may be achieved when the Riemannian barycenters are used to merge the two models. Such technique preserves the specialized domain knowledge associated with each model, while minimizing destructive interference between the models being merged.

Techniques for merging two or more transformer models described herein provide various beneficial technical effects and/or advantages. In particular, techniques described herein enable improved prediction performance of the merged model when compared to the conventional methods of merging models described above. For example, the merging of two or more transformer models based on Riemannian barycenters between weight matrix representations of the two or more transformer models on a curved manifold may result in improved accuracy of prediction when prompted with an instruction that is related to more than one knowledge domain. The improved prediction performance may be attributable to the preservation of prediction performance of each model (e.g., associated with a respective knowledge domain), for example, due to the more accurate representation of model parameter weight space geometry (e.g., when compared to those associated with the conventional methods described above).

The Riemannian barycenters minimize geodesic distances between weights of multiple fine-tuned models, fine-tuned for different knowledge domains. By accounting for complex, high-dimensional curvature in transformer weight distributions, a single merged transformer model generated by merging two or more transformer models using the techniques described herein reconcile each fine-tuned (e.g., specialized) transformer model's unique parameter shifts more faithfully. Accordingly, the techniques described herein preserve essential domain-specific features and deliver stronger multi-domain (e.g., multi-task) performance in prediction.

Moreover, the merging of the multiple fine-tuned models described herein mitigates the need to, for example, use an ensemble of the models being merged in order to preserve the essential domain-specific features in prediction. Accordingly, the multiple instances of prediction (e.g., by the constituent models of the ensemble) are no longer needed to preserve the essential domain-specific features, resulting in reduced computational resource usage for a given prediction, when compared to using the ensemble to perform the prediction.

Transformer Models

FIG. 1 depicts an example of a transformer model architecture. In particular, FIG. 1 depicts pre-trained model 100 including a plurality of processing layers that are configured to receive various inputs and output token probabilities based on those inputs. Pre-trained model 100 is a model that has already undergone a general training process on a large universal training dataset.

As one example, pre-trained model 100 includes an input embedding layer 104 configured to generate embeddings of inputs 102. Input embedding layer 104 generates embeddings of inputs 102 by converting raw input tokens of inputs 102 into vector representations that can be processed by subsequent processing layers. Vector representations are a useful format, for example for an LM, to represent inputs 102 because the vectors are able to capture semantic relationships between tokens such that similar words end up with similar vector representations. A positional encoding 106 is also embedded with the input embeddings prior to being processed by layer block 108. Layer block 108 includes processing layers such as a multi-head attention network, addition & normalization layers, and a feed forward network.

Multi-head attention networks allow models to process different segments of an input sequence in parallel. For example, the attention mechanism is split into several parallel heads that are each configured to learn different relationship patterns in the data. The outputs from each head are then combined. Addition & normalization layers include a residual connection step ("Add") and a layer normalization step ("Norm"). The residual connection preserves information by adding the input directed to the transformed output, while the layer normalization helps to scale summed values to have consistent statistical properties. In other words, the "Add" step helps to prevent information from being lost during transformation, and the "Norm" step helps to keep output values in a reasonable range as they are processed through downstream layers. A feed forward network is a neural network layer that independently processes each position in the sequence by applying different linear transformations with a nonlinear activation in between the linear transformations. This causes the input vector to transform into a higher-dimensional space and then back to its original dimension.

Pre-trained model 100 also includes an output embedding layer 112 that is configured to generate embeddings of outputs 110. A positional encoding 114 is also embedded with output embeddings prior to being further processed by layer block 116. Positional encodings are used in transformer-based models, like pre-trained model 100, to provide information about the order of tokens in a sequence. This allows pre-trained model 100 to process sequences of tokens while maintaining awareness of token order. Layer block 116 includes different processing layers, such as multi-head attention networks, addition & normalization layers, and a feed forward network.

Output from layer block 108 is provided as input to layer block 116, for example, at the second multi-head attention network. Output from layer block 108 is considered intermediate output of pre-trained model 100 because it is output at an intermediary layer and further processed by subsequent layers within pre-trained model 100.

Output from layer block 116 is further processed by linear layer 118. Linear layers 118 are configured to apply a weighted matrix to layer input and adding a bias vector, which causes the inputs to be mapped to a different dimension without non-linearity. A Softmax layer 120 is applied to the output from linear layer 118 and is configured to generate token output probabilities 122. Softmax layers 120 convert raw model outputs into probability distributions by exponentiating each input and normalizing the inputs so that all values sum to one. It is typically used as the final layer in machine learning models, such as LMs and other classification-type models. It should be appreciated that pre-trained model 100 may include any number of processing layers and any configuration of those processing layers to facilitate its functionality, for example, as an LM. Pre-trained model 100 may be a third-party off-the-shelf model.

FIG. 1 depicts an example of a transformer model including processing layers, such as attention and feed forward layers, that have non-trivial geometric properties. Such transformer models, once fine-tuned on training datasets of different domains, may be merged, while preserving the specialized domain knowledge associated with each transformer model, by using the techniques described herein. While the example of FIG. 1 has been described with reference to a pre-trained transformer model, the same or similar model architecture described with reference to FIG. 1 is applicable for fine-tuned transformer models described herein.

Figure 2:
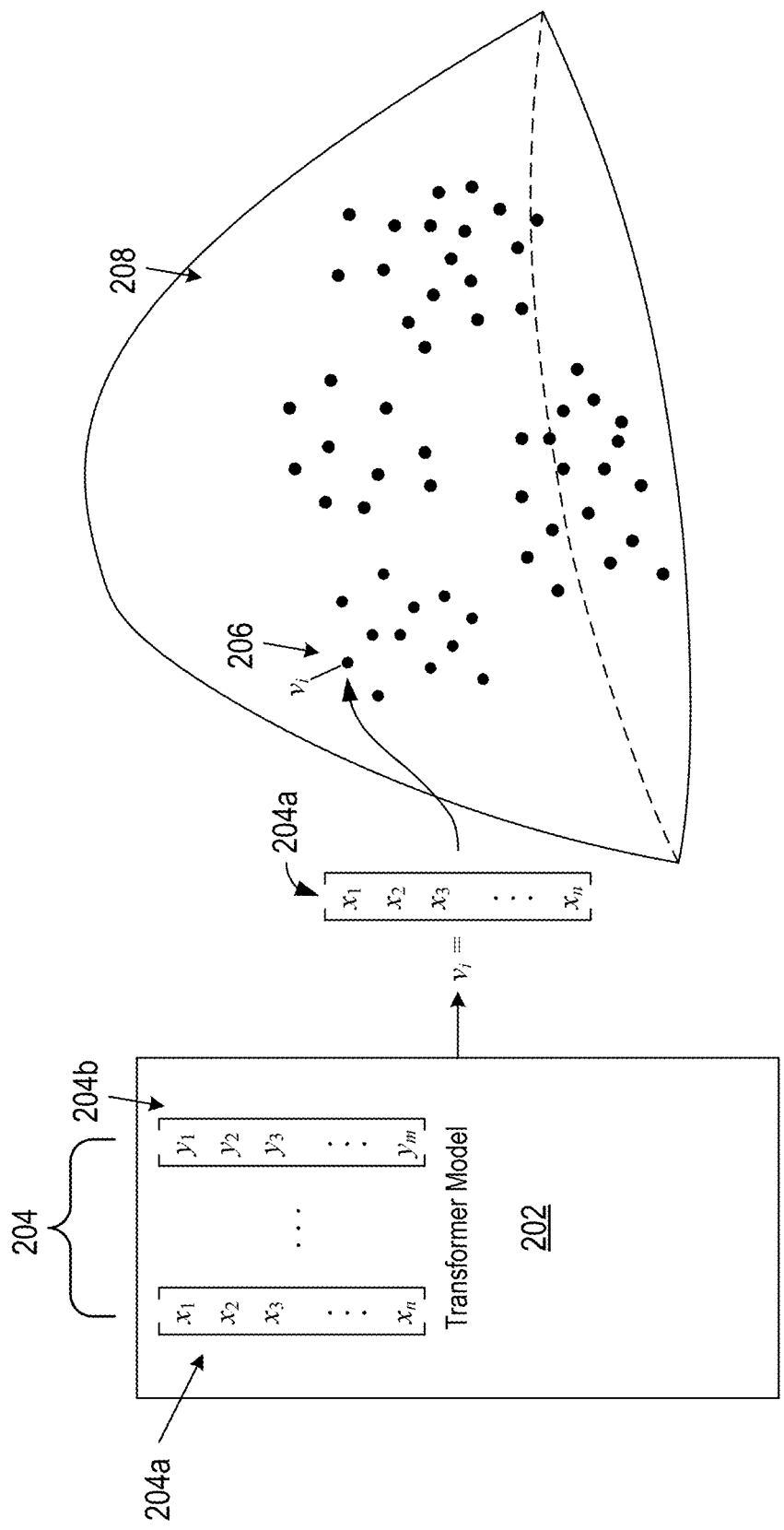
FIG. 2 depicts an example of representing a layer of parameter weights as a corresponding vector.

FIG. 2 depicts an example of representing a layer of parameter weights as a corresponding vector. As depicted, transformer model 202 includes a plurality of parameter weight layers 204. In the depicted example of FIG. 2, the plurality of parameter weight layers 204 are illustrated as a plurality of vectors, including a first vector 204a (corresponding to a first weight matrix) and a second vector 204b (corresponding to a second weight matrix). The plurality of vectors, such as the first vector 204a and the second vector 204b, may represent a plurality of layers of parameters of the transformer model 202. For example, such plurality of layers of parameters may correspond to the processing layers (e.g., including the attention networks and the feed forward network) described above with reference to FIG. 1. Accordingly, the first vector 204a may correspond to a first layer of parameters (e.g., of a first layer index), and the second vector 204b may correspond to a second layer of parameters (e.g., of a second layer index, different from the first layer index). The layer index may indicate to which particular layer among a transformer model's list of layers a given layer of parameters may correspond. For example, a layer of a first transformer model having a layer index and a layer of a second transformer model having the same layer index may correspond to the same layer when the two transformer models have the same model architecture. In the depicted example of FIG. 2, the first vector 204a has n values, and the second vector 204b has m values, where n and m correspond to the respective numbers of parameters at the layers to which the first vector 204a and the second vector 204b correspond. As depicted, the first vector 204a, $v_i$, is represented (e.g., mathematically) as a point 206 on a surface 208. In certain aspects, the surface 208 may be a curved manifold, as further described herein.

Figure 3:
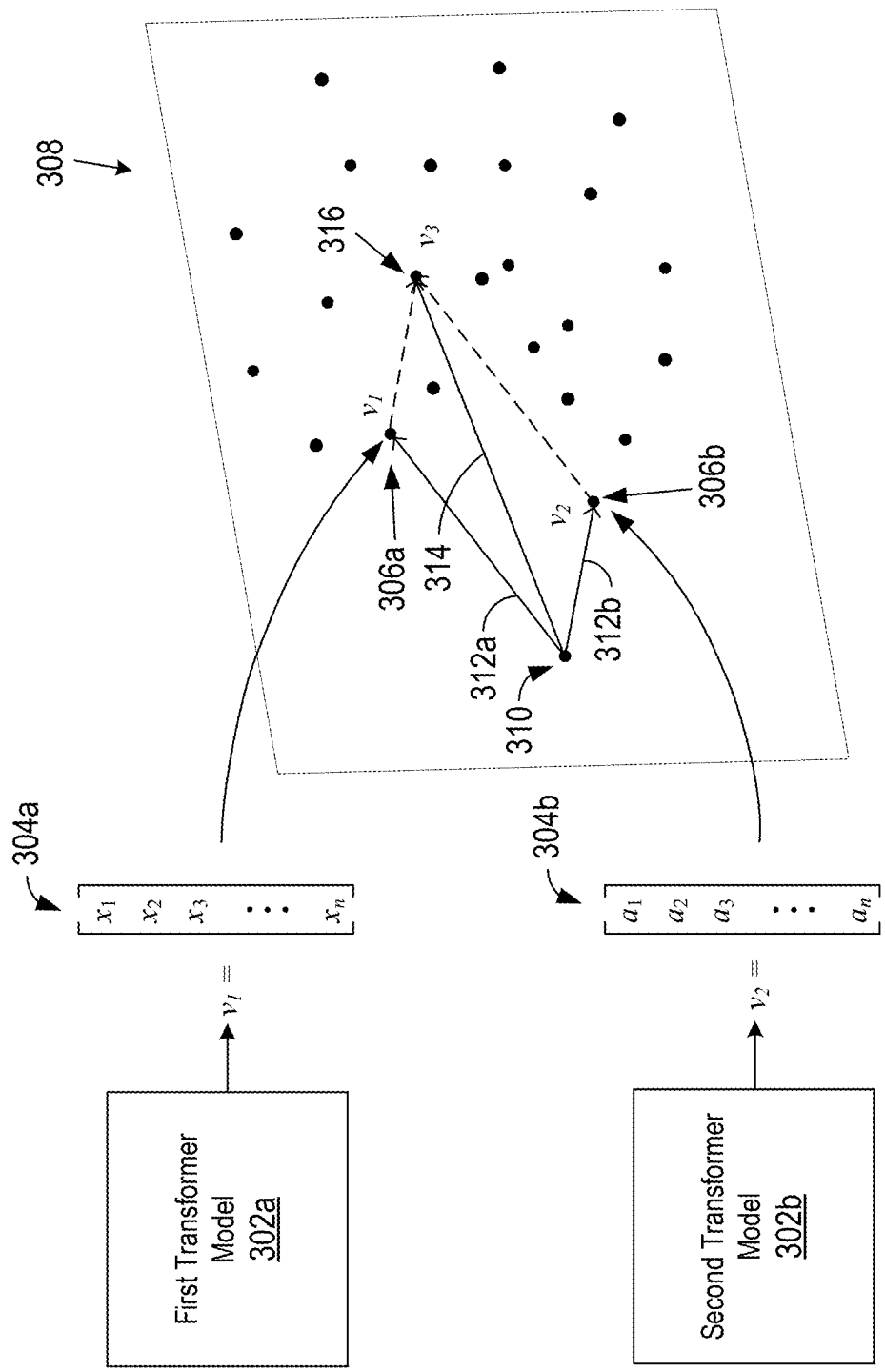
FIG. 3 depicts an example of merging two transformer models.

FIG. 3 depicts an example of merging two transformer models. The example depicted in FIG. 3 illustrates merging of a first transformer model 302a and a second transformer model 302b. In the depicted example of FIG. 3, a first layer of parameter weights of the first transformer model 302a is represented as a first vector 304a ($v_1$) (corresponding to a first weight matrix), and a second layer of parameter weights of the second transformer model 302b is represented as a second vector 304b ($v_2$) (corresponding to a second weight matrix). The first vector 304a and the second vector 304b are represented as, respectively, a first point 306a and a second point 306b on a surface 308. In the depicted example of FIG. 3, the two transformer models 302a, 302b are merged by corresponding weights of the two transformer models 302a, 302b being added.

For example, in the depicted example of FIG. 3, a third point 310 represents an initial layer of parameter weights, corresponding to the first point 306a and the second point 306b associated with, respectively, the first transformer model 302a and the second transformer model 302b. A first task vector 312a of FIG. 3 represents fine-tuning of the associated layer of parameter weights for the first transformer model 302a (e.g., from the initial layer of parameter weights, corresponding to the third point 310, to a fine-tuned layer of parameter weights, corresponding to the first point 306a). A second task vector 312b of FIG. 3 represents fine-tuning of the associated layer of parameter weights for the second transformer model 302b (e.g., from the initial layer of parameter weights, corresponding to the third point 310, to a fine-tuned layer of parameter weights, corresponding to the second point 306b). A task vector indicates a directional change in a model's weights, for example, when the model is fine-tuned, relative to its pre-trained state. For example, the first task vector 312a may represent fine-tuning on a first dataset of a first knowledge domain, and the second task vector 312b may represent fine-tuning on a second dataset of a second knowledge domain, where the first knowledge domain and the second knowledge domain are different. Thus, the first weight of the first transformer model 302a may be merged with the second weight of the second transformer model 302b by adding the first task vector 312a to the second task vector 312b. This addition results in a merged task vector 314. The merged task vector 314 represents "fine-tuning" of the associated parameter (e.g., from the initial weight, corresponding to the third point 310, to a merged weight, corresponding to a fourth point 316). For example, the merged task vector 314 represents the merging of the fine-tuning associated with the first transformer model 302a and the fine-tuning associated with the second transformer model 302b. The fourth point 316 may correspond to a third vector, $v_3$, which represents the merged weight of the corresponding parameter (e.g., corresponding to the first point 306a and the second point 306b).

In the depicted example of FIG. 3, the surface 308 may be a Euclidean space, where the first task vector 312a and the second task vector 312b are added. When the surface 308 is a Euclidean space, the merging of the first transformer model 302a and the second transformer model 302b using the naïve parameter averaging may not sufficiently account for the high-dimensional and non-linear structure of the weight space of the parameters of the transformer models. Accordingly, prediction performance of the merged model may be negatively affected (e.g., where the specific domain knowledge of each of the two transformer models 302a, 302b may not be preserved), as described above.

Figure 4:
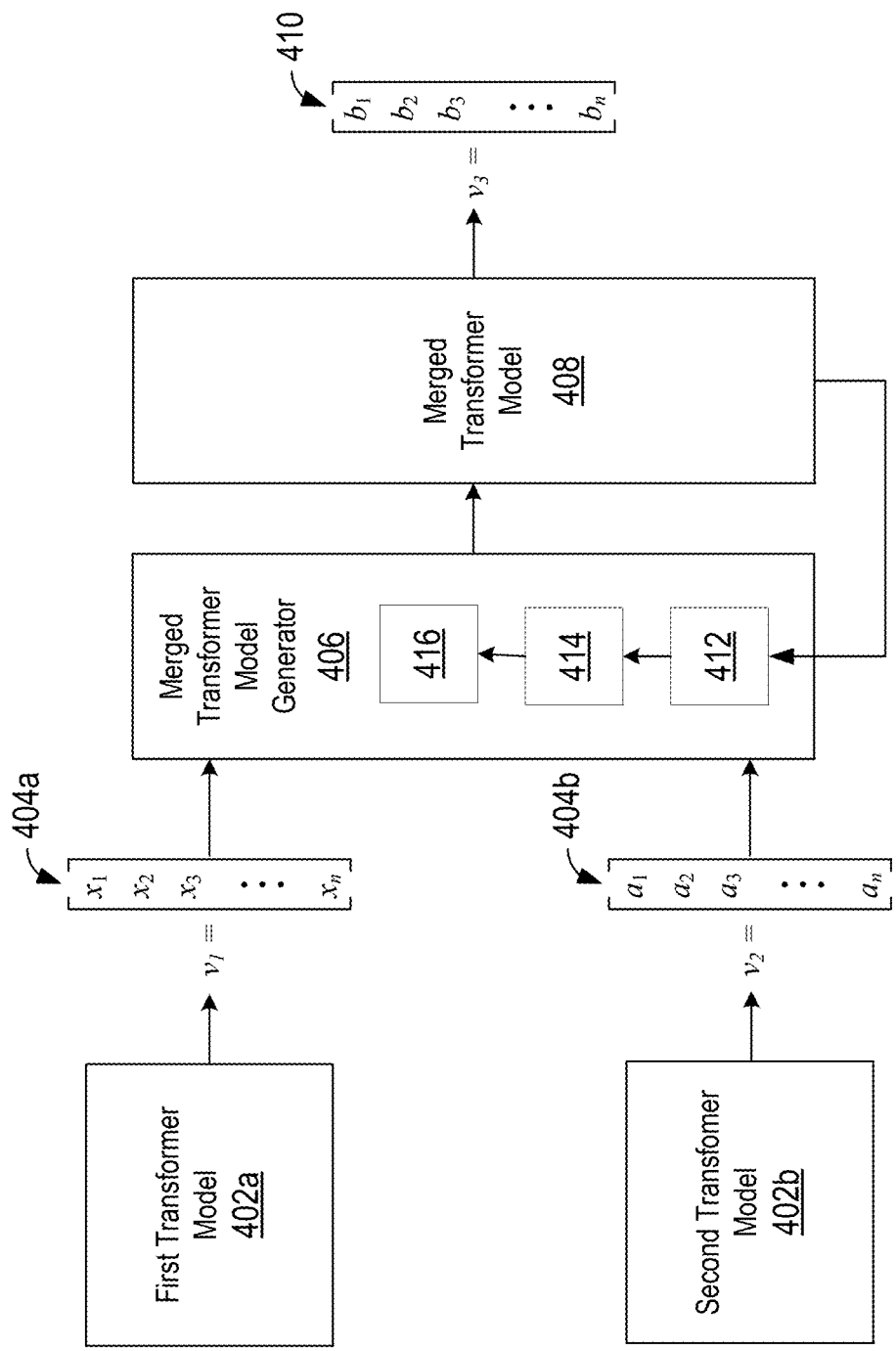
FIG. 4 depicts an example of merging two transformer models using a merged transformer model generator.

Examples of Merging Transformer Models Using Riemannian Barycenters of High-Dimensional Transformer Weights FIG. 4 depicts an example of merging two transformer models (first transformer model 402a and second transformer model 402b) using a merged transformer model generator 406. The example depicted in FIG. 4 illustrates an example solution to the technical problems described above and associated with the conventional methods of merging transformer models (e.g., insufficiently accounting for the high-dimensional and non-linear structure of the weight space of the transformer models). The transformer models 402a, 402b may each be an example of the transformer model 202 of FIG. 2 or the model 100 of FIG. 1.

Similar to the transformer model 202 of FIG. 2, the first transformer model 402a may include a plurality of parameter weight layers, where a given layer of parameter weights of the first transformer model 402a may be represented as a first vector 404a, $v_1$. Similarly, the second transformer model 402b may include a plurality of parameter weight layers, where a given layer of parameter weights of the second transformer model 402b may be represented as a second vector 404b, $v_2$. The merged transformer model generator 406 obtains the first vector 404a and the second vector 404b, and generates a merged transformer model 408 based on the first vector 404a and the second vector 404b. The merged transformer model 408 includes a plurality of parameter weight layers, where a given layer may be represented as a third vector 410, $v_3$. In some aspects, the merged transformer model generator 406 uses Riemannian barycenters (e.g., between a first point corresponding to the first vector 404a and a second point corresponding to the second vector 404b) on a curved manifold for merging the first vector 404a and the second vector 404b, as described further herein with reference to FIG. 7.

In order for the first transformer model 402a and the second transformer model 402b to be merged, the two transformer models 402a, 402b have the same model architecture. For example, the two transformer models 402a, 402b may have a same number of layers and a same number of parameters in each layer. Accordingly, when such layers of parameter weights of the two transformer models 402a, 402b are merged, the resulting layer of parameter weights of the merged transformer model 408 would include the same number of parameter weights (e.g., n).

In certain aspects, an additional transformer model (e.g., a third transformer model) may be merged with the merged transformer model 408. For example, the merged transformer model 408 and the third transformer model may be treated as the two transformer models 402a, 402b of the example depicted in FIG. 4, to be merged. In this way, three or more transformer models may be merged by merging two transformer models first to generate a first merged transformer model, then merging the first merged transformer model with the third transformer model, and so on. In some aspects, three or more transformer models may be merged simultaneously, as depicted in and described with reference to FIG. 6.

In certain cases, as depicted in the example of FIG. 4, the merged transformer model generator 406 includes a bias factor selector 412 that is used to select a bias factor (e.g., among a plurality of candidate bias factors), as well as a merged transformer model evaluator 414 and a merged transformer model selector 416. The selected bias factor may bias the merged transformer model 408 toward a certain transformer model of the transformer models being merged (e.g., the first transformer model 402a or the second transformer model 402b), or result in best performance of the merged transformer model 408. For example, the merged transformer model generator 406 may iteratively generate more than one merged transformer model 408 while applying a unique bias factor (e.g., using the bias factor selector 412) to generate each merged transformer model 408, and evaluate (e.g., using the merged transformer model evaluator 414 and using an evaluation dataset) the performance (accuracy) of each generated merged transformer model 408. Then, the merged transformer model generator 406 may identify the version of the merged transformer model 408 (e.g., applying a specific bias factor) that results in the best performance, for example, by using the merged transformer model selector 416. For example, the merged transformer model selector 416 may select the specific bias factor that results in the best performance of the identified version of the merged transformer model 408. Additional details regarding the bias factor are described herein with respect to FIG. 7.

Figure 5:
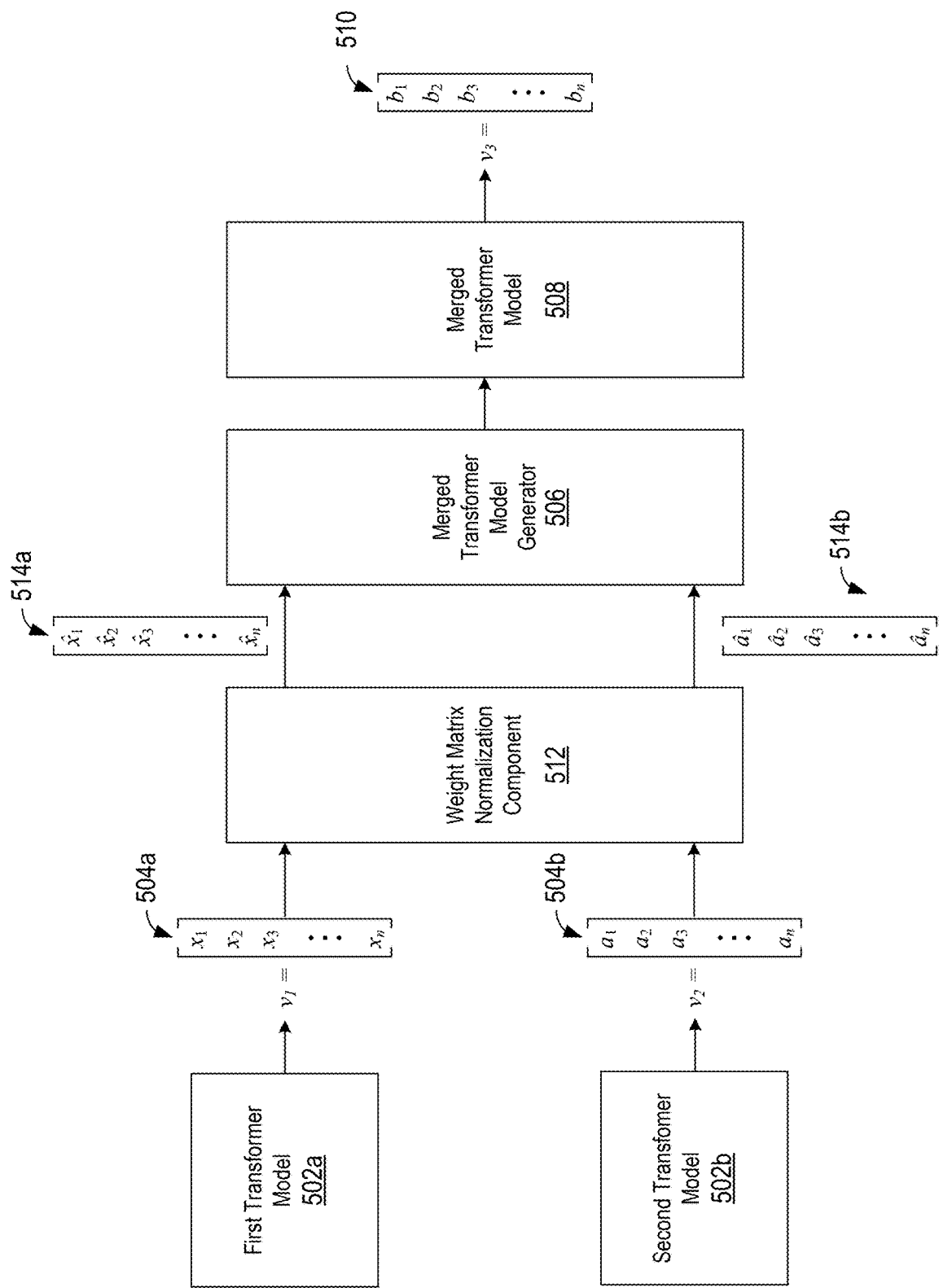
FIG. 5 depicts another example of merging two transformer models using a merged transformer model generator.

FIG. 5 depicts another example of merging two transformer models (a first transformer model 502a and a second transformer model 502b) using a merged transformer model generator 506. The example depicted in FIG. 5 illustrates another example solution to the technical problems described above and associated with the conventional methods of merging transformer models (e.g., without sufficiently accounting for the high-dimensional and non-linear structure of the weight space of the transformer models). The first transformer model 502a and the second transformer model 502b may be examples of, respectively, the first transformer model 402a and the second transformer model 402b of FIG. 4 as well as the transformer model 202 of FIG. 2 and the model 100 of FIG. 1. As similarly described with reference to the corresponding components of FIG. 4, the first transformer model 502a may include a plurality of parameter weight layers, where a given layer of parameter weights may be represented as a first vector 504a, $v_1$. Similarly, the second transformer model 502b may include a plurality of parameter weight layers, where a given layer of parameter weights may be represented as a second vector 504b, $v_2$.

In certain aspects, as depicted in the example of FIG. 5, a weight matrix normalization component 512 obtains the first vector 504a and the second vector 504b, and generates a first normalized vector 514a and a second normalized vector 514b. For example, the weight matrix normalization component 512 may use a z-score normalization method to generate the first normalized vector 514a and the second normalized vector 514b. A z-score normalization method transforms a set of parameter weights (e.g., of the first vector 504a) to have a mean of 0 and a standard deviation of 1. The normalization performed by the weight matrix normalization component 512 scales the parameter weights of the first vector 504a and the second vector 504b to lie within a defined range of values (e.g., −1 to 1). The normalization prevents features with larger parameter weights from dominating the merging process described herein, thereby improving reliability and efficiency of the merging process.

The merged transformer model generator 506 obtains the first normalized vector 514a and the second normalized vector 514b, and generates a merged transformer model 508 based on the first normalized vector 514a and the second normalized vector 514b. The merged transformer model 508 includes a plurality of parameter weight layers, where a given layer of parameter weights may be represented as a third vector 510, $v_3$. In some aspects, the merged transformer model generator 506 uses Riemannian barycenters on a curved manifold (e.g., between a first point corresponding to the first normalized vector 514a and a second point corresponding to the second normalized vector 514b) for merging the first vector 504a and the second vector 504b, as described further herein with reference to FIG. 7.

Figure 6:
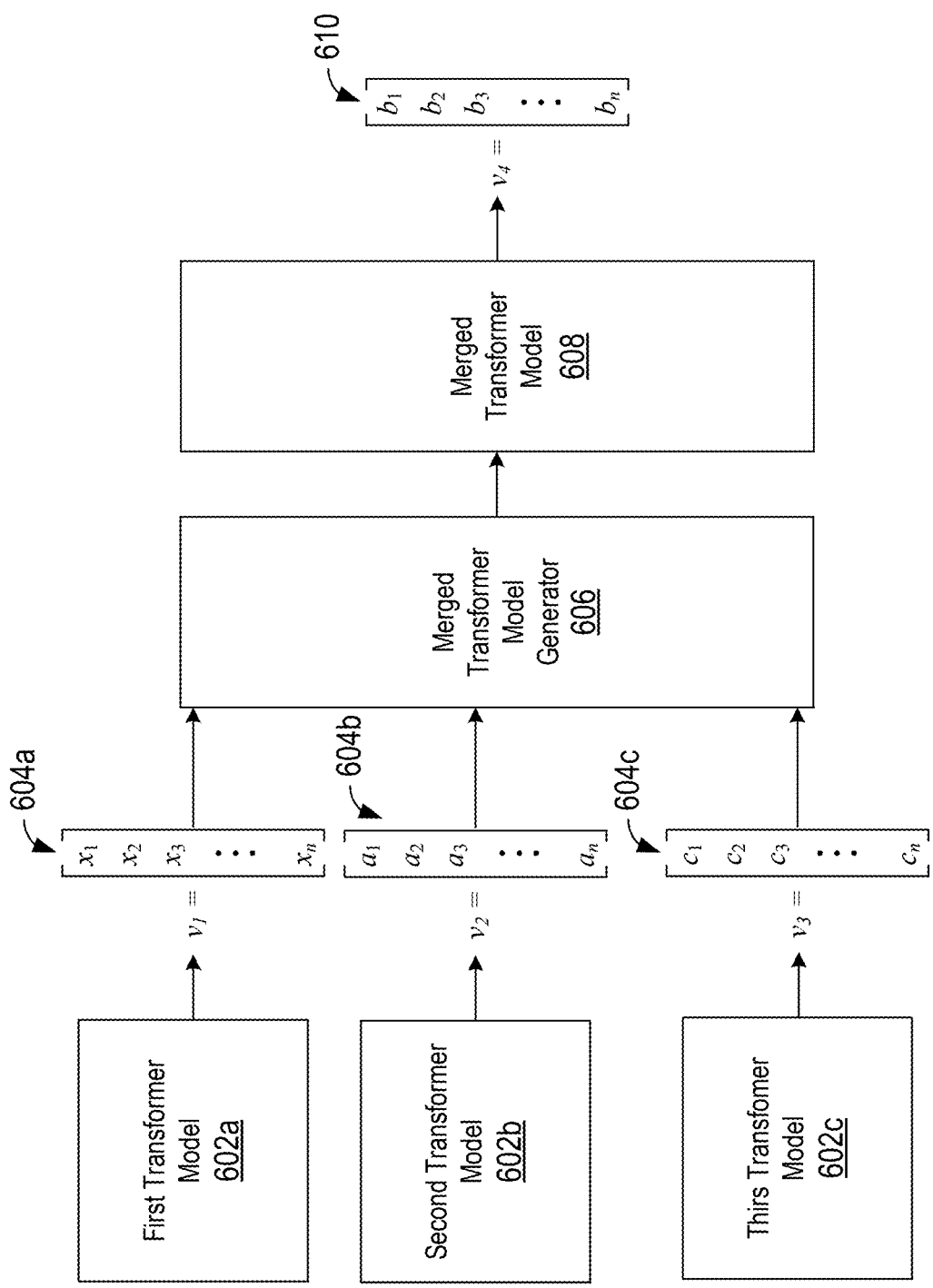
FIG. 6 depicts an example of merging three transformer models using a merged transformer model generator.

FIG. 6 depicts an example of merging three transformer models (a first transformer model 602a, a second transformer model 602b, and a third transformer model 602c) (e.g., simultaneously) using a merged transformer model generator 606. The example depicted in FIG. 6 illustrates yet another example solution to the technical problems described above and associated with the conventional methods of merging transformer models. The transformer models 602a, 602b, 602c may be examples of the transformer model 202 of FIG. 2 and the model 100 of FIG. 1 as well as, respectively, the transformer models 402a, 402b of FIG. 4 and the transformer models 502a, 502b of FIG. 5.

Similar to the transformer model 202 of FIG. 2, the first transformer model 602a may include a plurality of parameter weight layers, where a given layer of parameter weights may be represented as a first vector 604a, $v_1$. Similarly, the second transformer model 602b may include a plurality of parameter weight layers, where a given layer of parameter weights may be represented as a second vector 604b, $v_2$. Further, the third transformer model 602c may include a plurality of parameter weight layers, where a given layer of parameter weights may be represented as a third vector 604c, $v_3$. The merged transformer model generator 606 obtains the first vector 604a, the second vector 604b, and the third vector 604c, and generates a merged transformer model 608 based on the first vector 604a, the second vector 604b, and the third vector 604c. The merged transformer model 608 includes a plurality of parameter weight layers, where a given layer of parameter weights may be represented as a fourth vector 610, $v_4$. In some aspects, the merged transformer model generator 606 uses Riemannian barycenters (e.g., between a first point corresponding to the first vector 604a, a second point corresponding to the second vector 604b, and a third point corresponding to the third vector 604c) on a curved manifold for merging the first vector 604a, the second vector 604b, and the third vector 604c, as described further herein with reference to FIG. 7. While three transformer models are illustrated in FIG. 6, more transformer models (e.g., four, five, six, etc.) may be merged in a similar manner, without departing from the scope of the present disclosure. Merging more than two transformer models (e.g., three, four, five, six, etc.) at the same time may better preserve complementary features of the transformer models being merged, and may reduce cumulative loss (e.g., when compared to merging two transformer models at a time) because merging more than two transformer models (e.g., three, four, five, six, etc.) at the same time may align all of these transformer models in a shared space at once, avoiding repeated distortions and drift that may occur with sequential pairwise merging.

Figure 7:
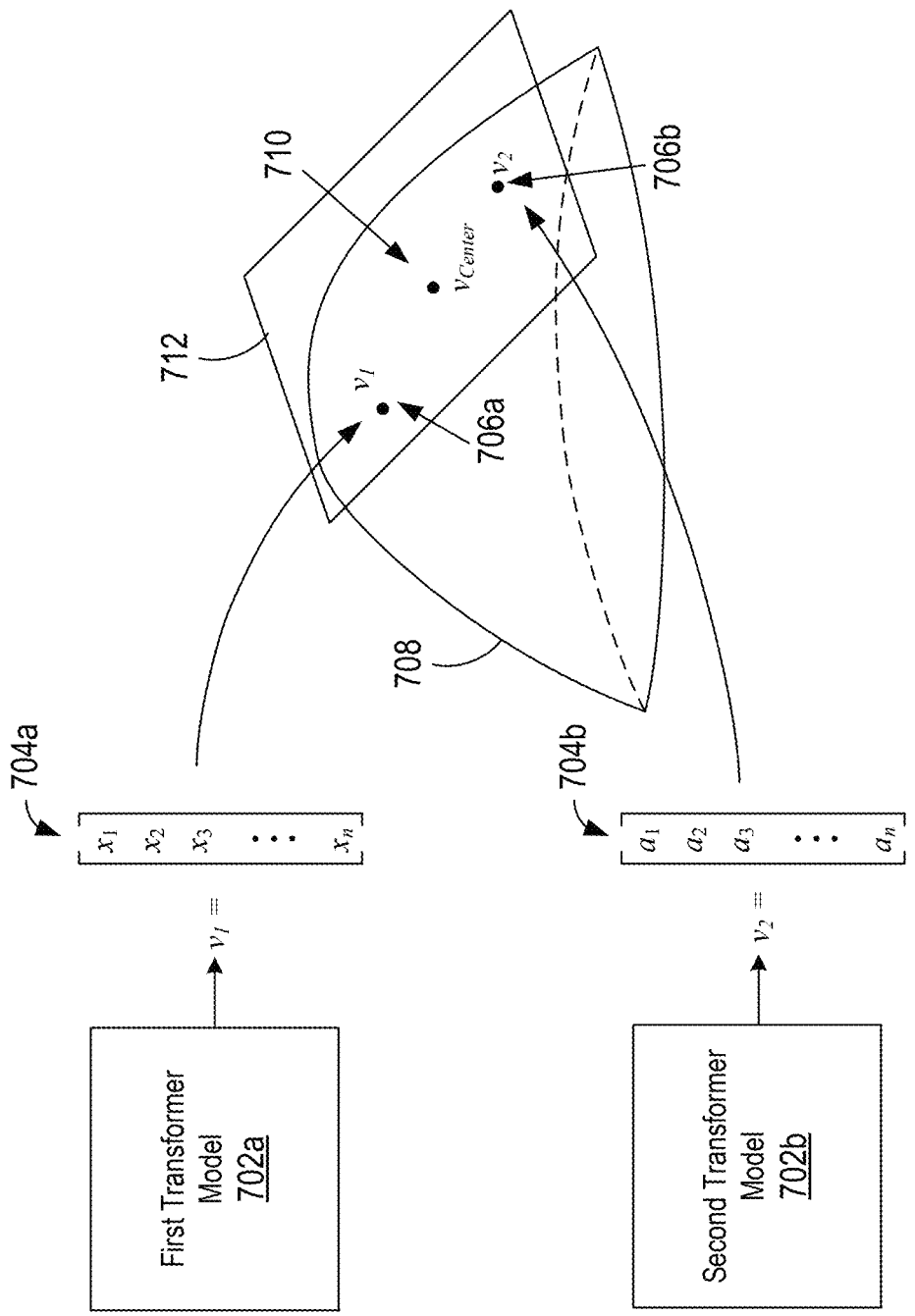
FIG. 7 depicts an example of merging two transformer models using a manifold representation.

FIG. 7 depicts an example of merging two transformer models (a first transformer model 702a and a second transformer model 702b) using a manifold representation, such as a curved manifold representation, and a Riemannian barycenter. The example depicted in FIG. 7 illustrates an example solution to the technical problems described above and associated with the conventional methods of merging transformer models. The transformer models 702a, 702b may be examples of the transformer model 202 of FIG. 2 and the model 100 of FIG. 1 as well as, respectively, the transformer models 502a, 502b of FIG. 5 and the transformer models 602a, 602b of FIG. 6.

Similar to the transformer model 202 of FIG. 2, the first transformer model 702a may include a plurality of parameter weight layers, where a given layer of parameter weights may be represented as a first vector 704a, $v_1$. Similarly, the second transformer model 702b may include a plurality of parameter weight layers, where a given layer of parameter weights may be represented as a second vector 704b, $v_2$. The first vector and the second vector may be mapped, respectively, to a first point 706a and a second point 706b on a curved manifold 708. The first point 706a and the second point 706b may be used (e.g., by a merged transformer model generator, such as the merged transformer model generator 406, 506, 606 of FIG. 4, FIG. 5, and FIG. 6) to generate an optimized weight matrix based on a manifold-constrained optimization of the first point 706a and the second point 706b on the curved manifold 708.

For example, a merge point 710 may be determined on a tangent space 712 of the curved manifold 708 that minimizes a total distance from the merge point 710 to the first point 706a and the second point 706b. The merge point 710 corresponds to the optimized weight matrix (e.g., based on the first vector 704a and the second vector 704b). Specifically, the merge point 710 may be a Riemannian barycenter between the first point 706a and the second point 706b on the curved manifold 708. For example, the Riemannian barycenter may be represented as $$W_{bary} = \arg_W \min \sum_{i=1}^{T} \alpha_i d_M^2(W_w W_i) . W_{bary}$$

refers to a vector (corresponding to a weight matrix) at a barycenter, T refers to a total number of transformer models (e.g., points) being merged, W refers to a candidate barycenter vector, $W_i$ refers to each vector (weight matrix) from each transformer model, $d^2_M(W, W_i)$ refers to a square of a distance (d) between two vectors (e.g., the candidate barycenter vector and a respective vector corresponding to each transformer model of the transformer models being merged) on a manifold (M), and $\alpha_i$ refers to a bias factor described further herein (which may be equal for each transformer model, unless the merged transformer model is biased for certain transformer model(s)). Thus, $W_{bary}$ minimizes the sum of its squared distance to each respective vector of the vectors being merged.

The manifold-constrained optimization of the first point 706a and the second point 706b on the curved manifold 708 may use, for example, a gradient descent on the curved manifold 708. That is, the merge point 710 may be determined by iteratively updating or moving a candidate merge point (corresponding to a candidate optimized weight matrix) along the tangent space 712 toward a point that minimizes the total distance to the first point 706a and the second point 706b (or more generally, all points corresponding to weight matrices of transformer models being merged). Each update is computed in the tangent space 712 at the current point for W. A defined move (e.g., by a defined distance and/or in a defined direction; "stepping") of the W is made along the tangent space 712, and then "retracted" (e.g., mapped via an exponential map) back onto the curved manifold 708, ensuring W remains on the curved manifold 708 (e.g., rather than drifting off in a purely Euclidean space). The exponential map is a function that takes a point on a Riemannian manifold and a tangent vector at that point and returns the point on the Riemannian manifold that results from moving along the geodesic starting at the original point in the direction of the tangent vector for a unit time. Mathematically, this involves computing the sum of $\alpha_i d^2_M (W, W_i)$, stepping W in the tangent space direction, and then projecting W back to the curved manifold 708, and so on. This process iteratively converges to the Riemannian barycenter ($W_{bary}$), which can then be translated into the merged model's parameters. Once such point has been determined (e.g., after convergence), this point (e.g., Riemannian barycenter) may be mapped (e.g., transformed) to a plurality of parameter weights (e.g., corresponding a specific layer index) which may replace a set of parameter weights, of the same layer index, of a base transformer model (e.g., the first transformer model 702a or second transformer model 702b). The same process may be repeated for all applicable layers of parameters (e.g., processing layers, such as including the attention networks and the feed forward network) to generate a merged transformer model.

Since the curved manifold representation of the first vector 704a and the second vector 704b takes into account the high-dimensional and non-linear structure of the parameter weight space of the transformer models 702a, 702b, such technique of merging the transformer models 702a, 702b (e.g., using Riemannian barycenters on a curved manifold) preserves the specialized domain knowledge associated with each of the transformer models 702a, 702b, while minimizing destructive interference between these models. In certain experiments, the performance of the merged transformer model described herein was compared against the performance of other "merged" transformer models that were prepared based on other conventional methods of merging. The merged transformer model described herein produced better performance scores than the other merged transformer models, as shown below in Table 1.

TABLE 1

| Dataset | Merge Method | | | |
|---|---|---|---|---|
| | Summation | LERP | SLERP | Using Riemannian Barycenters |
| MATH | 84.5 | 84.7 | 84.7 | 85.1 |
| GSM8K | 51.9 | 52.4 | 52.3 | 53.1 |
| HumanEval | 72.6 | 73.1 | 72.9 | 74.8 |
| MBPP | 72.8 | 72.4 | 73.1 | 75.1 |

Figure 8:
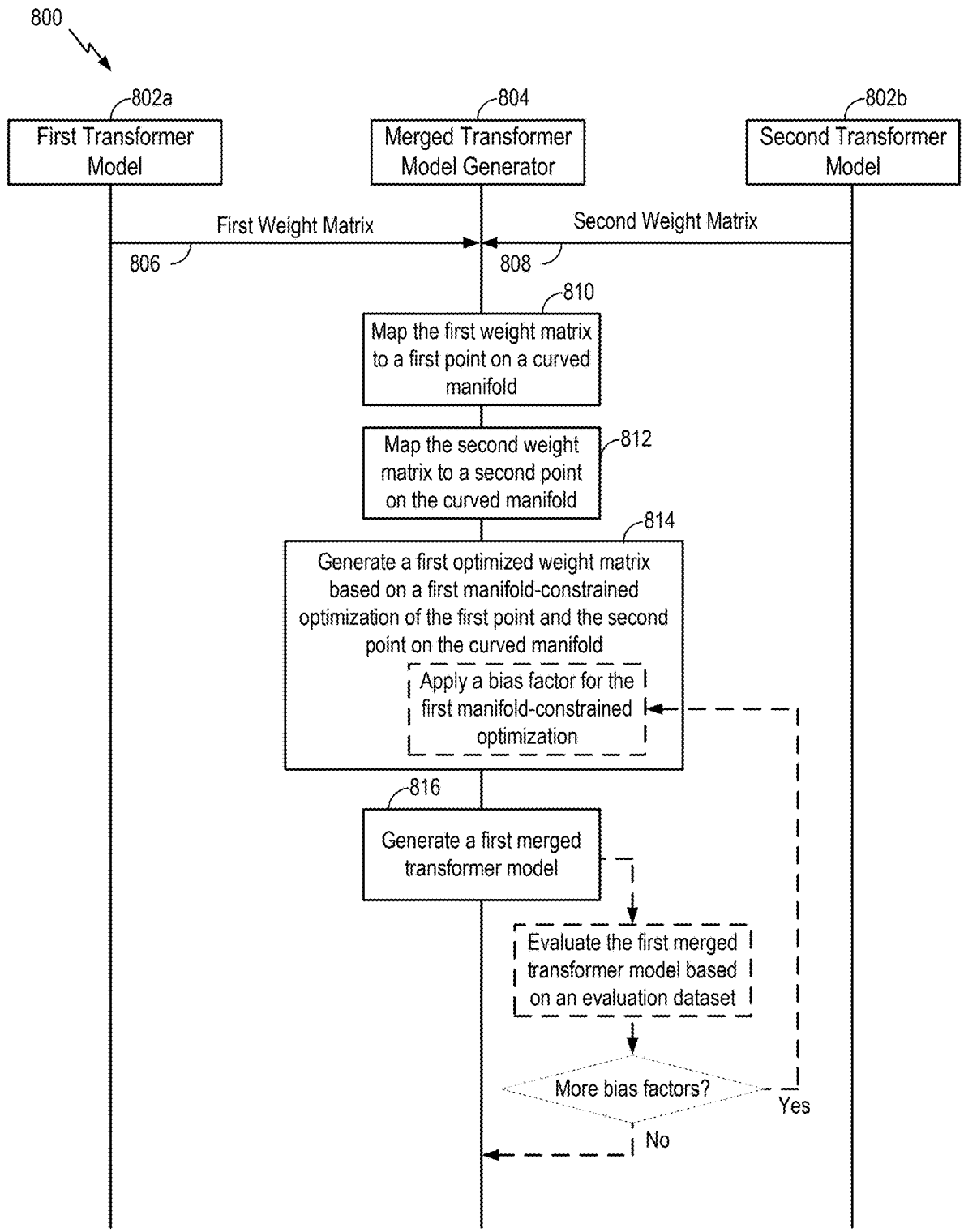
FIG. 8 depicts a process flow for communications between a merged transformer model generator, a first transformer model, and a second transformer model.

Example Process Flows for Merging Transformer Models Using Riemannian Barycenters of High-Dimensional Transformer Weights FIG. 8 depicts a process flow 800 for communications between a merged transformer model generator 804, a first transformer model 802a, and a second transformer model 802b. In some aspects, the merged transformer model generator 804 may be an example of the merged transformer model generators 406, 506, 606 depicted in and described with respect to, respectively, FIG. 4, FIG. 5, and FIG. 6. The first transformer model 802a may be an example of the first transformer models 402a, 502a, 602a, 702a depicted in and described with respect to, respectively, FIG. 4, FIG. 5, FIG. 6, and FIG. 7. Moreover, the second transformer model 802b may be an example of the second transformer model 402b, 502b, 602b, 702b depicted in and described with respect to, respectively, FIG. 4, FIG. 5, FIG. 6, and FIG. 7. Note that any operations illustrated with dashed lines may indicate that that operation is an optional or alternative example, unless noted otherwise.

At 806, the merged transformer model generator 804 obtains a first weight matrix of the first transformer model 802a. The first weight matrix may be an example of the first vectors 404a, 504a, 604a, 704a of, respectively, FIG. 4, FIG. 5, FIG. 6, and FIG. 7. The first weight matrix may include a first layer of parameters of the first transformer model 802a.

At 808, the merged transformer model generator 804 obtains a second weight matrix of the second transformer model 802b. The second weight matrix may be an example of the second vectors 404b, 504b, 604b, 704b of, respectively, FIG. 4, FIG. 5, FIG. 6, and FIG. 7. The second weight matrix may include a second layer of parameters of the second transformer model 802b.

The first transformer model 802a and the second transformer model 802b may include a same number of layers and a same number of parameters (e.g., have a same model architecture). Further, the first layer (of the first transformer model 802*a*) and the second layer (of the second transformer model 802*b*) may be associated with a same layer index (e.g., corresponding to a given processing layer, such as including an attention network or a feed forward network of the model).

In certain aspects, the first transformer model 802*a* is a fine-tuned model that has been fine-tuned for a first knowledge domain, and the second transformer model 802*b* is another fine-tuned model that has been fine-tuned for a second knowledge domain, where the first knowledge domain and the second knowledge domain are different. In some cases, the first transformer model 802*a* and the second transformer model 802*b* may be fine-tuned from a same base model.

At 810, the merged transformer model generator 804 maps the first weight matrix to a first point on a curved manifold. The first point may be an example of the first point 706*a* depicted in and described with reference to FIG. 7. The curved manifold may be an example of the curved manifold 708 depicted in and described with reference to FIG. 7.

In certain cases, the first weight matrix may be mapped to the first point on the curved manifold by applying a mathematical transformation that takes a raw weight matrix and re-expresses it as a point on the curved manifold. For example, if a raw weight matrix of a transformer model layer is a 2-by-2 weight matrix (e.g., the weight matrix=((1, −1), (2, 3)). This weight matrix may be "flattened" into a 4-dimensional vector: v=(1, −1, 2, 3). A point on a 3-sphere (e.g., a sphere generalized to 3 dimensions) may be a unit vector (e.g., with a magnitude of 1) in a 4-dimensional Euclidean space. The mapping may be done by normalizing the weight matrix: $\sqrt{(1^2+(-1)^2+2^2+3^2)}=\sqrt{15}$. Thus, the mapped point on the 3-sphere may be $(1/\sqrt{15})$ (1, −1, 2, 3). This mapped point would lie on the curved manifold. The distance between two points u and v on the curved manifold may be the geodesic distance, which is arccos (u·v) (where (u·v) is the dot product of the two points, and the angle between them on the curved manifold determines the geodesic distance).

At 812, the merged transformer model generator 804 maps (e.g., in the same or similar manner described above with respect to the first weight matrix) the second weight matrix to a second point on the curved manifold. The second point may be an example of the second point 706*b* depicted in and described with reference to FIG. 7. The curved manifold may be an example of the curved manifold 708 depicted in and described with reference to FIG. 7.

In certain aspects, the merged transformer model generator 804 may use a normalization component to normalize the first weight matrix and the second weight matrix to generate a first normalized weight matrix and a second normalized weight matrix, as described with reference to FIG. 5. In some cases, the normalization component may be implemented as part of the merged transformer model generator 804. For example, a weight matrix normalization component (e.g., the weight matrix normalization component 512 of FIG. 5) may be a part or a functionality of (e.g., included in) the merged transformer model generator 804, and the weight matrix normalization component may use a z-score normalization method to generate the first normalized weight matrix and the second normalized weight matrix. In this example, the merged transformer model generator 804 may map the first normalized weight matrix to the first point on the curved manifold and the second normalized weight matrix to the second point on the curved manifold.

At 814, the merged transformer model generator 804 generates a first optimized weight matrix based on a first manifold-constrained optimization of the first point and the second point on the curved manifold by determining a first merge point on a first tangent space of the curved manifold that minimizes a first total distance from the first merge point to the first point and the second point, where the first merge point corresponds to the first optimized weight matrix.

In certain aspects, the merged transformer model generator 804 may determine a Riemannian barycenter between the first point and the second point as the first merge point.

At 816, the merged transformer model generator 804 generates a first merged transformer model based on the first transformer model 802*a* and the second transformer model 802*b* by mapping the first optimized weight matrix to a first merged layer of parameters of the first merged transformer model, where the first merged layer is associated with a same layer index as the layer index of the first weight matrix and the layer index of the second weight matrix (e.g., as described above with respect to FIG. 7).

In certain aspects, the first manifold-constrained optimization from 814 may include applying a bias factor to the first total distance. The bias factor may be indicative of how close the first merge point is to the first point or the second point. In some cases, the merged transformer model generator 804 may obtain (e.g., from an operator) a plurality of candidate bias factors. For each candidate bias factor of the plurality of candidate bias factors, the merged transformer model generator 804 may apply the candidate bias factor to the first total distance for the first manifold-constrained optimization. After applying the candidate bias factor to the first total distance, the merged transformer model generator 804 may determine an accuracy of the first merged transformer model (e.g., using the candidate bias factor during the first manifold-constrained optimization) based on evaluating the first merged transformer model on an evaluation dataset. The merged transformer model generator 804 may determine the bias factor to use for the first merged transformer model by identifying a candidate bias factor of the plurality of candidate bias factors that is associated with a highest accuracy (e.g., when evaluated on the evaluation dataset). In some cases, the bias factor may influence how the first merge point is positioned between the transformer models' weight matrix representations on the curved manifold. The bias factor (at) may be adjusted to pull the first merge point (W) more toward a particular transformer model's parameters. For example, a given candidate bias factor of the plurality of candidate bias factors may be used to build a merged transformer model that is evaluated using the evaluation dataset. If a first transformer model's domain expertise may be more beneficial than a second transformer model's domain expertise, a greater weight may be applied for the distance from the first merge point to the first transformer model's weight matrix representation (e.g., applying a given bias factor to that distance). Applying the given bias factor to that distance (e.g., to bias toward the first transformer model) may yield better accuracy in evaluation using the evaluation dataset when compared to the cases with no bias or a bias toward the second transformer model. Thus, the bias factor may exploit a domain skew in the evaluation dataset by letting the final weights lean more toward a given transformer model's specialized knowledge.

In certain aspects, a third transformer model may be merged with the first merged transformer model, thereby performing a pairwise merge followed by a subsequent merge with another model, etc., when merging more than two transformer models. For example, the merged transformer model generator 804 may obtain a third vector corresponding to a third weight matrix and a fourth vector corresponding to a fourth weight matrix, where the third weight matrix includes a third layer of parameter weights of the first merged transformer model (e.g., from 816), and the fourth weight matrix includes a fourth layer of parameter weights of the third transformer model. The first merged transformer model and the third transformer model may include the same number of layers and the same number of parameters in each corresponding layer. Moreover, the third layer (of the first merged transformer model) and the fourth layer (of the third transformer model) may be associated with a same layer index. The merged transformer model generator 804 may map the third vector and the fourth vector to, respectively, a third point and a fourth point on the curved manifold. The merged transformer model generator 804 may generate a second optimized weight matrix based on a second manifold-constrained optimization of the third point and the fourth point on the curved manifold by determining a second merge point on a second tangent space of the curved manifold that minimizes a second total distance from the second merge point to the third point and the fourth point, where the second merge point corresponds to the second optimized weight matrix. The merged transformer model generator 804 may generate a second merged transformer model of the first merged transformer model and the third transformer model by mapping the second optimized weight matrix to a second merged layer of parameters of the second merged transformer model, where the second merged layer is associated with the same layer index (e.g., as the third layer (of the first merged transformer model) and the fourth layer (of the third transformer model)).

In certain aspects, the process flow 800 may be used to merge more than two transformer models (e.g., simultaneously). Details regarding an example method of merging more than two transformer models (e.g., three transformer models) using the process flow 800 is depicted in and described with reference to FIG. 10.

Example Methods for Merging Transformer Models Using Riemannian Barycenters of High-Dimensional Transformer Weights FIG. 9 depicts an example method 900 for merging two or more machine learning models, such as two or more transformer models. In one aspect, method 900 can be implemented by the merged transformer model generators 406, 506, 606, 804 of, respectively, FIG. 4, FIG. 5, FIG. 6, and FIG. 8 and/or processing system 1100 of FIG. 11.

Method 900 starts at block 902 with obtaining a first weight matrix and a second weight matrix, the first weight matrix comprising a first layer of parameters of a first transformer model, the second weight matrix comprising a second layer of parameters of a second transformer model, the first transformer model and the second transformer model comprising a same number of layers and a same number of parameters, the first layer and the second layer associated with a same layer index. For example, the first weight matrix may be an example of the first vectors 404a, 504a, 604a, 704a of, respectively, FIG. 4, FIG. 5, FIG. 6, and FIG. 7, and the second weight matrix may be an example of the second vectors 404b, 504b, 604b, 704b of, respectively, FIG. 4, FIG. 5, FIG. 6, and FIG. 7.

Method 900 continues to block 904 with mapping the first weight matrix to a first point on a curved manifold, described with reference to FIG. 7.

Method 900 continues to block 906 with mapping the second weight matrix to a second point on the curved manifold, described with reference to FIG. 7.

Method 900 continues to block 908 with generating a first optimized weight matrix based on a first manifold-constrained optimization of the first point and the second point on the curved manifold by determining a first merge point on a first tangent space of the curved manifold that minimizes a first total distance from the first merge point to the first point and the second point, wherein the first merge point corresponds to the first optimized weight matrix. Certain details related to block 908 are described further herein, for example, with respect to step 814 of the process flow 800 of FIG. 8.

Method 900 continues to block 910 with generating a first merged transformer model of the first transformer model and the second transformer model by mapping the first optimized weight matrix to a first merged layer of parameters of the first merged transformer model, the first merged layer associated with the same layer index. Certain details related to block 910 are described further herein, for example, with respect to step 816 of the process flow 800 of FIG. 8.

The Riemannian barycenters (e.g., the first merge point described above with reference to method 900) minimize geodesic distances among multiple fine-tuned models, fine-tuned for different knowledge domains. By accounting for complex, high-dimensional curvature in transformer weight distributions, a single merged model (e.g., the first merged transformer model of method 900) generated by merging two or more transformer models using the techniques described herein reconcile each fine-tuned (e.g., specialized) model's unique parameter shifts more faithfully. Accordingly, the method 900 described herein preserves essential domain-specific features and deliver stronger multi-domain (e.g., multi-task) performance in prediction. Moreover, the method 900 mitigates the need to, for example, use an ensemble of the models being merged in order to preserve the essential domain-specific features in prediction. Accordingly, the multiple instances of prediction (e.g., by the constituent models of the ensemble) is no longer needed to preserve the essential domain-specific features, resulting in reduced computational resource usage for a given prediction, when compared to using the ensemble to perform the prediction.

Note that FIG. 9 is just one example of a method, and other methods including fewer, additional, or alternative operations are possible consistent with this disclosure.

Figure 10:
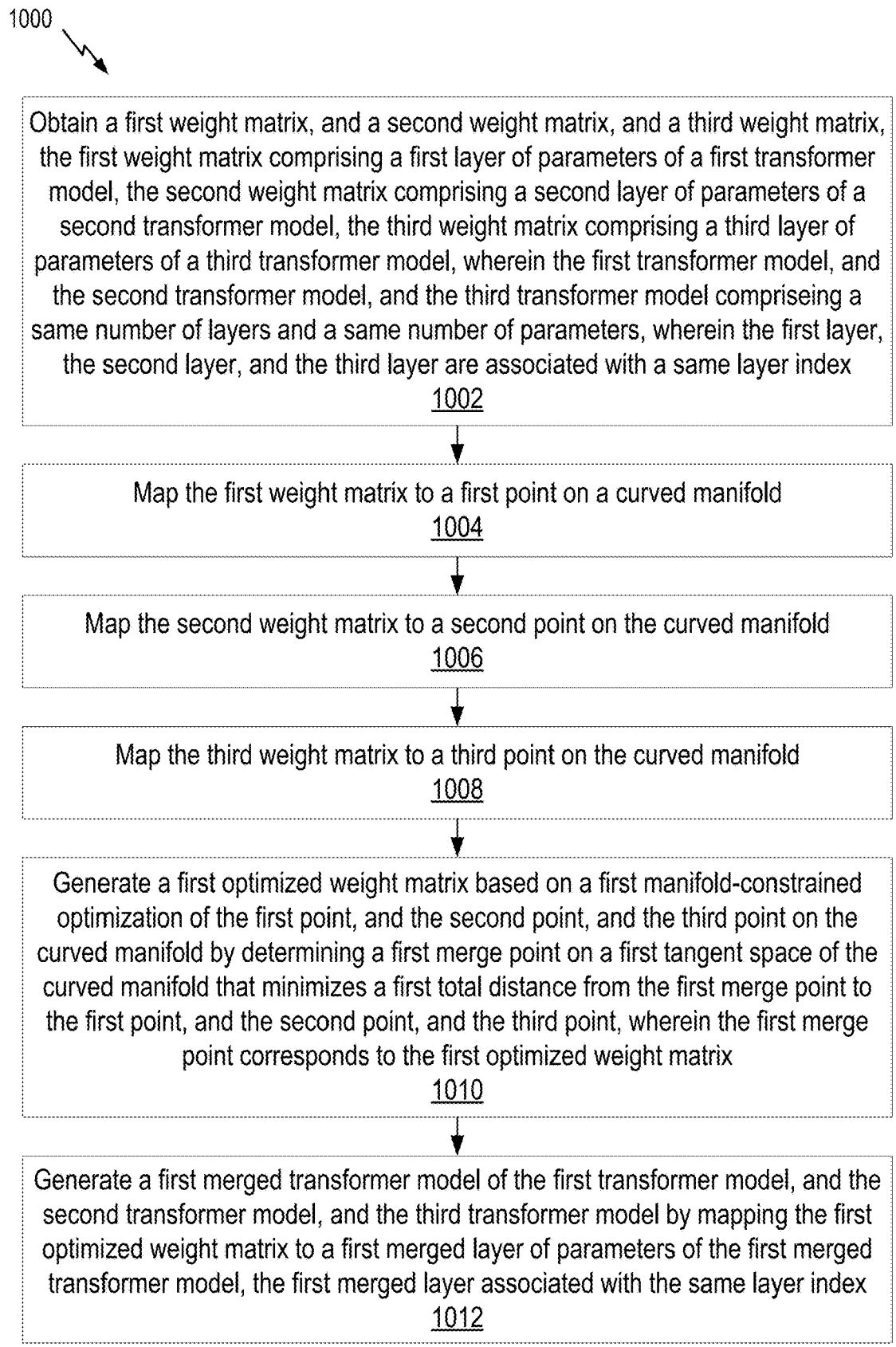
FIG. 10 depicts another method for merging transformer models.

FIG. 10 depicts an example method 1000 for merging two or more machine learning models, such as two or more transformer models (e.g., three transformer models). In one aspect, method 1000 can be implemented by the merged transformer model generators 406, 506, 606, 804 of, respectively, FIG. 4, FIG. 5, FIG. 6, and FIG. 8 and/or processing system 1100 of FIG. 11.

Method 1000 starts at block 1002 with obtaining a first weight matrix, a second weight matrix, and a third weight matrix, the first weight matrix comprising a first layer of parameters of a first transformer model, the second weight matrix comprising a second layer of parameters of a second transformer model, the third weight matrix comprising a third layer of parameters of a third transformer model, wherein the first transformer model, the second transformer model, and the third transformer model comprise a same number of layers and a same number of parameters, wherein the first layer, the second layer, and the third layer are associated with a same layer index. For example, the first weight matrix may be an example of the first vectors 404a, 504a, 604a, 704a of, respectively, FIG. 4, FIG. 5, FIG. 6, and FIG. 7, and the second weight matrix may be an example of the second vectors 404b, 504b, 604b, 704b of, respectively, FIG. 4, FIG. 5, FIG. 6, and FIG. 7. Moreover, the third weight matrix may be an example of the third vector 604c of FIG. 6.

Method 1000 continues to block 1004 with mapping the first weight matrix to a first point on a curved manifold, described with reference to FIG. 7.

Method 1000 continues to block 1006 with mapping the second weight matrix to a second point on the curved manifold, described with reference to FIG. 7.

Method 1000 continues to block 1008 with mapping the third weight matrix to a third point on the curved manifold, described with reference to FIG. 7.

Method 1000 continues to block 1010 with generating a first optimized weight matrix based on a first manifold-constrained optimization of the first point, the second point, and the third point on the curved manifold by determining a first merge point on a first tangent space of the curved manifold that minimizes a first total distance from the first merge point to the first point, the second point, and the third point, wherein the first merge point corresponds to the first optimized weight matrix. Certain details related to block 1010 are described further herein, for example, with respect to step 814 of the process flow 800 of FIG. 8.

Method 1000 continues to block 1012 with generating a first merged transformer model of the first transformer model, the second transformer model, and the third transformer model by mapping the first optimized weight matrix to a first merged layer of parameters of the first merged transformer model, the first merged layer associated with the same layer index. Certain details related to block 1012 are described further herein, for example, with respect to step 816 of the process flow 800 of FIG. 8.

The Riemannian barycenters (e.g., the first merge point described above with reference to method 1000) minimize geodesic distances among multiple fine-tuned models, fine-tuned for different knowledge domains. By accounting for complex, high-dimensional curvature in transformer weight distributions, a single merged model (e.g., the first merged transformer model of method 1000) generated by merging two or more transformer models using the techniques described herein reconcile each fine-tuned (e.g., specialized) model's unique parameter shifts more faithfully. Accordingly, the method 1000 described herein preserves essential domain-specific features and deliver stronger multi-domain (e.g., multi-task) performance in prediction. Moreover, the method 1000 mitigates the need to, for example, use an ensemble of the models being merged in order to preserve the essential domain-specific features in prediction. Accordingly, the multiple instances of prediction (e.g., by the constituent models of the ensemble) is no longer needed to preserve the essential domain-specific features, resulting in reduced computational resource usage for a given prediction, when compared to using the ensemble to perform the prediction.

Merging more than two transformer models (e.g., three or more) at once (as described with respect to the method 1000) may offer certain technical advantages. In some cases, the method 1000 may provide a better cross-domain synergy (e.g., when compared to a pairwise merge followed by a second merge with a third transformer model, etc.). When all three transformer models (e.g., trained for three different domains) are merged simultaneously, the technical solution described herein (e.g., with respect to the method 1000 of FIG. 10) can balance the specialized parameters from each domain at once, potentially capturing synergies or trade-offs among the three domains more effectively than a pairwise merge followed by a second merge. The method 1000 may also use fewer iterations and/or have less accumulated error. Sequential merges may mean any approximation or optimization errors may be amplified. A single multi-model merge may need fewer passes over the transformer models (and possibly less re-mapping to and from the curved manifold), which may lead to fewer accumulated numerical or approximation errors. Furthermore, the method 1000 may allow reduced overall complexity by avoiding the overhead of generating, storing, and then re-merging an intermediate pairwise merge, which can simplify code paths and potentially reduce total compute cost.

Note that FIG. 10 is just one example of a method, and other methods including fewer, additional, or alternative operations are possible consistent with this disclosure.

Figure 11:
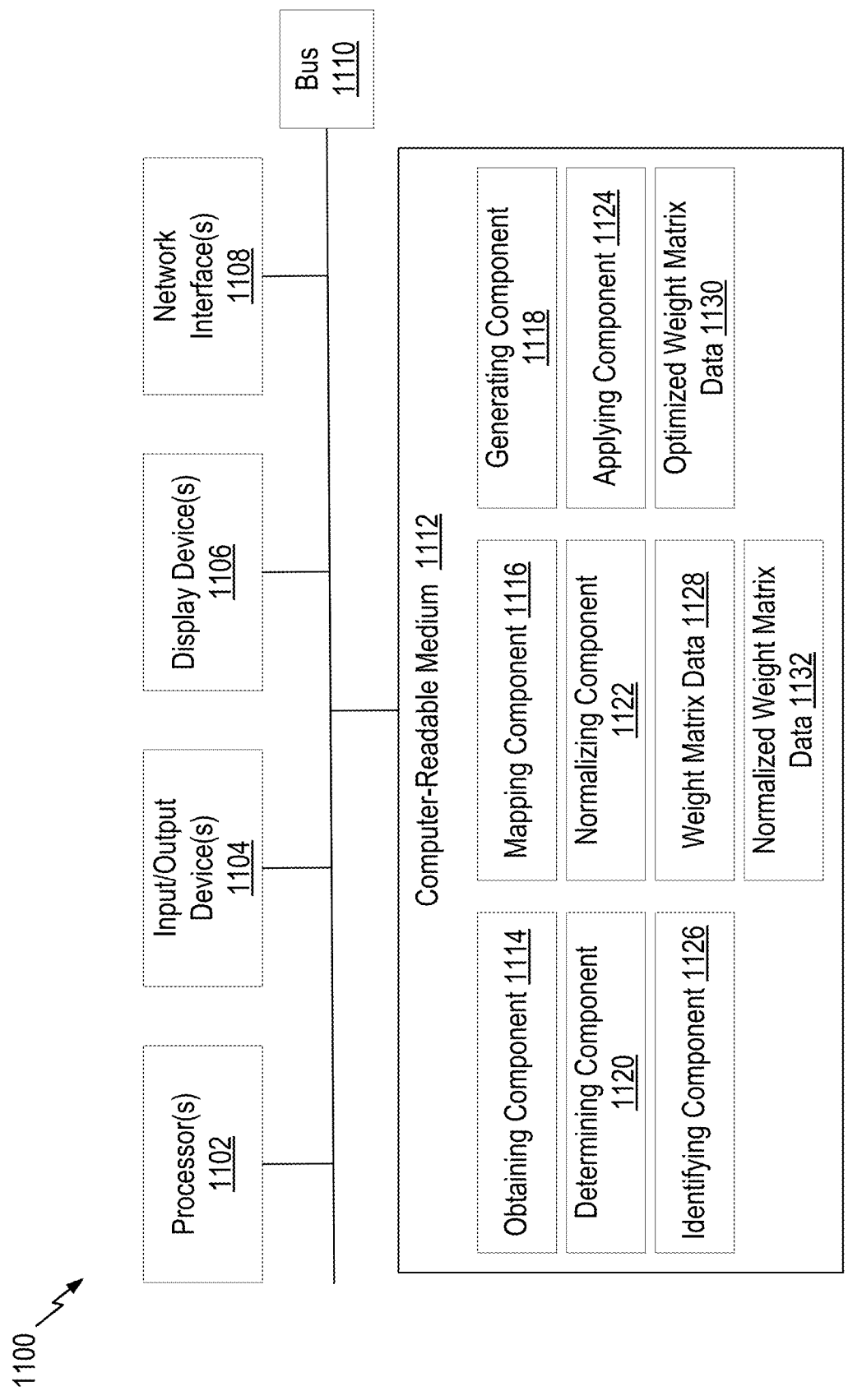
FIG. 11 depicts an example processing system with which aspects of the present disclosure can be performed.

Example Processing System for Merging Transformer Models Using Riemannian Barycenters of High-Dimensional Transformer Weights FIG. 11 depicts an example processing system 1100 configured to perform various aspects described herein, including, for example, methods 900 and 1000 as described above with respect to FIG. 9 and FIG. 10.

Processing system 1100 may generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1100 includes one or more processors 1102, one or more input/output devices 1104, one or more display devices 1106, one or more network interfaces 1108 through which processing system 1100 is connected to one or more networks (e.g., a local network, an intranet, the Internet, or any other group of processing systems communicatively connected to each other), and computer-readable medium 1112. In the depicted example, the aforementioned components are coupled by a bus 1110, which may generally be configured for data exchange amongst the components. Bus 1110 may be representative of multiple buses, while only one is depicted for simplicity.

Processor(s) 1102 are generally configured to retrieve and execute instructions stored in one or more memories, including local memories like computer-readable medium 1112, as well as remote memories and data stores. Similarly, processor(s) 1102 are configured to store application data residing in local memories like the computer-readable medium 1112, as well as remote memories and data stores. More generally, bus 1110 is configured to transmit programming instructions and application data among the processor(s) 1102, display device(s) 1106, network interface(s) 1108, and/or computer-readable medium 1112. In certain aspects, processor(s) 1102 are representative of a one or more central processing units (CPUs), graphics processing unit (GPUs), tensor processing unit (TPUs), accelerators, and other processing devices.

Input/output device(s) 1104 may include any device, mechanism, system, interactive display, and/or various other hardware and software components for communicating information between processing system 1100 and a user of processing system 1100. For example, input/output device(s) 1104 may include input hardware, such as a keyboard, touch screen, button, microphone, speaker, and/or other device for receiving inputs from the user and sending outputs to the user.

Display device(s) 1106 may generally include any sort of device configured to display data, information, graphics, user interface elements, and the like to a user. For example, display device(s) 1106 may include internal and external displays such as an internal display of a tablet computer or an external display for a server computer or a projector.

Display device(s) 1106 may further include displays for devices, such as augmented, virtual, and/or extended reality devices. In various aspects, display device(s) 1106 may be configured to display a graphical user interface.

Network interface(s) 1108 provide processing system 1100 with access to external networks and thereby to external processing systems. Network interface(s) 1108 can generally be any hardware and/or software capable of transmitting and/or receiving data via a wired or wireless network connection. Accordingly, network interface(s) 1108 can include a communication transceiver for sending and/or receiving any wired and/or wireless communication.

Computer-readable medium 1112 may be a volatile memory, such as a random access memory (RAM), or a nonvolatile memory, such as nonvolatile random access memory (NVRAM), or the like. In this example, computer-readable medium 1112 includes obtaining component 1114, mapping component 1116, generating component 1118, determining component 1120, normalizing component 1122, applying component 1124, identifying component 1126, weight matrix data 1128, optimized weight matrix data 1130, and normalized weight matrix data 1132.

In certain aspects, obtaining component 1114 is configured to obtain a first weight matrix (e.g., weight matrix data 1128) and a second weight matrix (weight matrix data 1128) as described with respect to block 902 of FIG. 9. In certain aspects, obtaining component 1114 is configured to obtain a first weight matrix (e.g., weight matrix data 1128), a second weight matrix (weight matrix data 1128), and a third weight matrix (weight matrix data 1128) as described with respect to block 1002 of FIG. 10.

In certain aspects, mapping component 1116 is configured to map the first weight matrix to a first point on a curved manifold and to map the second weight matrix to a second point on the curved manifold as described with respect to blocks 904 and 906 of FIG. 9. In certain aspects, mapping component 1116 is configured to map the first weight matrix to a first point on a curved manifold, to map the second weight matrix to a second point on the curved manifold, and to map the third weight matrix to a third point on the curved manifold as described with respect to blocks 1004, 1006, and 1008 of FIG. 10.

In certain aspects, generating component 1118 is configured to generate a first optimized weight matrix (e.g., optimized weight matrix data 1130) based on a first manifold-constrained optimization of the first point and the second point on the curved manifold and to generate a first merged transformer model of the first transformer model and the second transformer model as described with respect to blocks 908 and 910 of FIG. 9. In certain aspects, generating component 1118 is configured to generate a first optimized weight matrix (e.g., optimized weight matrix data 1130) based on a first manifold-constrained optimization of the first point, the second point, and the third point on the curved manifold and to generate a first merged transformer model of the first transformer model, the second transformer model, and the third transformer model as described with respect to blocks 1010 and 1012 of FIG. 10.

In certain aspects, determining component 1120 is configured to determine a first merge point on a first tangent space of the curved manifold that minimizes a first total distance from the first merge point to the first point and the second point as described with respect to block 908 of FIG. 9. In certain aspects, determining component 1120 is configured to determine a first merge point on a first tangent space of the curved manifold that minimizes a first total distance from the first merge point to the first point, the second point, and the third point as described with respect to block 1010 of FIG. 10.

In certain aspects, normalizing component 1122 is configured to normalize the first weight matrix and the second weight matrix to generate a first normalized weight matrix (e.g., normalized weight matrix data 1132) and a second normalized weight matrix (e.g., normalized weight matrix data 1132) as described with respect to the process flow 800 of FIG. 8.

In certain aspects, applying component 1124 is configured to apply a bias factor to the first total distance as described with respect to the process flow 800 of FIG. 8.

In certain aspects, identifying component 1126 is configured to identify a first candidate bias factor of the plurality of candidate bias factors as described with respect to the process flow 800 of FIG. 8.

Note that FIG. 11 is just one example of a processing system consistent with aspects described herein, and other processing systems having additional, alternative, or fewer components are possible consistent with this disclosure.

Example Clauses

Implementation examples are described in the following numbered clauses:

Clause 1: A method, comprising: obtaining a first weight matrix and a second weight matrix, the first weight matrix comprising a first layer of parameters of a first transformer model, the second weight matrix comprising a second layer of parameters of a second transformer model, the first transformer model and the second transformer model comprising a same number of layers and a same number of parameters, the first layer and the second layer associated with a same layer index; mapping the first weight matrix to a first point on a curved manifold; mapping the second weight matrix to a second point on the curved manifold; generating a first optimized weight matrix based on a first manifold-constrained optimization of the first point and the second point on the curved manifold by determining a first merge point on a first tangent space of the curved manifold that minimizes a first total distance from the first merge point to the first point and the second point, wherein the first merge point corresponds to the first optimized weight matrix; and generating a first merged transformer model of the first transformer model and the second transformer model by mapping the first optimized weight matrix to a first merged layer of parameters of the first merged transformer model, the first merged layer associated with the same layer index.

Clause 2: The method of Clause 1, wherein: the first transformer model has been fine-tuned for a first knowledge domain, the second transformer model has been fine-tuned for a second knowledge domain, and the first knowledge domain and the second knowledge domain are different.

Clause 3: The method of any one of Clauses 1-2, further comprising: normalizing the first weight matrix and the second weight matrix to generate a first normalized weight matrix and a second normalized weight matrix, wherein: mapping the first weight matrix to the first point on the curved manifold comprises mapping the first normalized weight matrix to the first point on the curved manifold, and mapping the second weight matrix to the second point on the curved manifold comprises mapping the second normalized weight matrix to the second point on the curved manifold.

Clause 4: The method of any one of Clauses 1-3, wherein determining the first merge point on the first tangent space of the curved manifold comprises determining a Riemannian barycenter between the first point and the second point.

Clause 5: The method of any one of Clauses 1-4, wherein the first manifold-constrained optimization further comprises applying a bias factor to the first total distance, the bias factor indicative of how close the first merge point is to the first point or the second point.

Clause 6: The method of Clause 5, further comprising: for each respective candidate bias factor of a plurality of candidate bias factors: applying the respective candidate bias factor to the first total distance for the first manifold-constrained optimization; and after applying the respective candidate bias factor to the first total distance, determining an accuracy of the first merged transformer model using an evaluation dataset; and determining the bias factor by identifying a candidate bias factor of the plurality of candidate bias factors associated with a highest accuracy of the first merged transformer model using the evaluation dataset.

Clause 7: The method of any one of Clauses 1-6, further comprising: obtaining a third weight matrix and a fourth weight matrix, the third weight matrix comprising a third layer of parameters of the first merged transformer model, the fourth weight matrix comprising a fourth layer of parameters of a third transformer model, the first merged transformer model and the third transformer model comprising the same number of layers and the same number of parameters, the third layer and the fourth layer associated with another same layer index; mapping the third weight matrix to a third point on the curved manifold; mapping the fourth weight matrix to a fourth point on the curved manifold; generating a second optimized weight matrix based on a second manifold-constrained optimization of the third point and the fourth point on the curved manifold by determining a second merge point on a second tangent space of the curved manifold that minimizes a second total distance from the second merge point to the third point and the fourth point, wherein the second merge point corresponds to the second optimized weight matrix; and generating a second merged transformer model of the first merged transformer model and the third transformer model by mapping the second optimized weight matrix to a second merged layer of parameters of the second merged transformer model, the second merged layer associated with the another same layer index.

Clause 8: A method, comprising: obtaining a first weight matrix, a second weight matrix, and a third weight matrix, the first weight matrix comprising a first layer of parameters of a first transformer model, the second weight matrix comprising a second layer of parameters of a second transformer model, the third weight matrix comprising a third layer of parameters of a third transformer model, wherein the first transformer model, the second transformer model, and the third transformer model comprise a same number of layers and a same number of parameters, wherein the first layer, the second layer, and the third layer are associated with a same layer index; mapping the first weight matrix to a first point on a curved manifold; mapping the second weight matrix to a second point on the curved manifold; mapping the third weight matrix to a third point on the curved manifold; generating a first optimized weight matrix based on a first manifold-constrained optimization of the first point, the second point, and the third point on the curved manifold by determining a first merge point on a first tangent space of the curved manifold that minimizes a first total distance from the first merge point to the first point, the second point, and the third point, wherein the first merge point corresponds to the first optimized weight matrix; and generating a first merged transformer model of the first transformer model, the second transformer model, and the third transformer model by mapping the first optimized weight matrix to a first merged layer of parameters of the first merged transformer model, the first merged layer associated with the same layer index.

Clause 9: The method of Clause 8, wherein: the first transformer model has been fine-tuned for a first knowledge domain, the second transformer model has been fine-tuned for a second knowledge domain, the third transformer model has been fine-tuned for a third knowledge domain, and the first knowledge domain, the second knowledge domain, and the third knowledge domain are different from one another.

Clause 10: The method of any one of Clauses 8-9, further comprising: normalizing the first weight matrix, the second weight matrix, and the third weight matrix to generate a first normalized weight matrix, a second normalized weight matrix, and a third normalized weight matrix, wherein: mapping the first weight matrix to the first point on the curved manifold comprises mapping the first normalized weight matrix to the first point on the curved manifold, mapping the second weight matrix to the second point on the curved manifold comprises mapping the second normalized weight matrix to the second point on the curved manifold, and mapping the third weight matrix to the third point on the curved manifold comprises mapping the third normalized weight matrix to the third point on the curved manifold.

Clause 11: The method of any one of Clauses 8-10, wherein determining the first merge point on the first tangent space of the curved manifold comprises determining a Riemannian barycenter between the first point, the second point, and the third point.

Clause 12: The method of any one of Clauses 8-11, wherein the first manifold-constrained optimization further comprises applying a bias factor to the first total distance, the bias factor indicative of how close the first merge point is to the first point, the second point, or the third point.

Clause 13: The method of Clause 12, further comprising: for each respective candidate bias factor of a plurality of candidate bias factors: applying the respective candidate bias factor to the first total distance for the first manifold-constrained optimization; and after applying the respective candidate bias factor to the first total distance, determining an accuracy of the first merged transformer model using an evaluation dataset; and determining the bias factor by identifying a candidate bias factor of the plurality of candidate bias factors associated with a highest accuracy of the first merged transformer model using the evaluation dataset.

Clause 14: A processing system, comprising: a memory comprising computer-executable instructions; and a processor configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium storing program code for causing a processing system to perform the steps of any one of Clauses 1-13.

Clause 17: A computer program product embodied on a computer-readable storage medium comprising code for performing a method in accordance with any one of Clauses 1-13.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   obtaining a first weight matrix and a second weight matrix, the first weight matrix comprising a first layer of parameters of a first transformer model, the second weight matrix comprising a second layer of parameters of a second transformer model, different from the first transformer model, the first transformer model and the second transformer model comprising a same number of layers and a same number of parameters, the first layer and the second layer associated with a same layer index;
   mapping the first weight matrix to a first point on a curved manifold;
   mapping the second weight matrix to a second point on the curved manifold;
   generating a first optimized weight matrix by performing a first manifold-constrained optimization for determining a first merge point on a first tangent space of the curved manifold, wherein the first merge point minimizes a first total distance from the first merge point to the first point and the second point and preserves domain-specific features of the first transformer model and the second transformer model, wherein the first merge point corresponds to the first optimized weight matrix, and the first manifold-strained optimization comprises iteratively updating a candidate merge point towards the first merge point; and
   generating a first merged transformer model of the first transformer model and the second transformer model by mapping the first optimized weight matrix to a first merged layer of parameters of the first merged transformer model, the first merged layer associated with the same layer index.

2. The method of claim 1, wherein:
   the first transformer model has been fine-tuned for a first knowledge domain,
   the second transformer model has been fine-tuned for a second knowledge domain, and
   the first knowledge domain and the second knowledge domain are different.

3. The method of claim 1, further comprising:
   normalizing the first weight matrix and the second weight matrix to generate a first normalized weight matrix and a second normalized weight matrix,
   wherein:
      mapping the first weight matrix to the first point on the curved manifold comprises mapping the first normalized weight matrix to the first point on the curved manifold, and
      mapping the second weight matrix to the second point on the curved manifold comprises mapping the second normalized weight matrix to the second point on the curved manifold.

4. The method of claim 1, wherein determining the first merge point on the first tangent space of the curved manifold comprises determining a Riemannian barycenter between the first point and the second point.

5. The method of claim 1, wherein the first manifold-constrained optimization further comprises applying a bias factor to the first total distance, the bias factor indicative of how close the first merge point is to the first point or the second point.

6. The method of claim 5, further comprising:
for each respective candidate bias factor of a plurality of candidate bias factors:
applying the respective candidate bias factor to the first total distance for the first manifold-constrained optimization; and
after applying the respective candidate bias factor to the first total distance, determining an accuracy of the first merged transformer model using an evaluation dataset; and
determining the bias factor by identifying a candidate bias factor of the plurality of candidate bias factors associated with a highest accuracy of the first merged transformer model using the evaluation dataset.

7. The method of claim 1, further comprising:
obtaining a third weight matrix and a fourth weight matrix, the third weight matrix comprising a third layer of parameters of the first merged transformer model, the fourth weight matrix comprising a fourth layer of parameters of a third transformer model, different from the first transformer model, the second transformer model, and the first merged transformer, the first merged transformer model and the third transformer model comprising the same number of layers and the same number of parameters, the third layer and the fourth layer associated with another same layer index;
mapping the third weight matrix to a third point on the curved manifold;
mapping the fourth weight matrix to a fourth point on the curved manifold;
generating a second optimized weight matrix by performing a second manifold-constrained optimization for determining a second merge point on a second tangent space of the curved manifold, wherein the second merge point minimizes a second total distance from the second merge point to the third point and the fourth point and preserves domain-specific features of the first merged transformer model and the third transformer model, wherein the second merge point corresponds to the second optimized weight matrix, and the second manifold-constrained optimization comprises iteratively updating another candidate merge point towards the second merge point; and
generating a second merged transformer model of the first merged transformer model and the third transformer model by mapping the second optimized weight matrix to a second merged layer of parameters of the second merged transformer model, the second merged layer associated with the other same layer index.

8. A processing system, comprising: one or more memories comprising computer-executable instructions; and one or more processors configured to execute the computer-executable instructions and cause the processing system to:
obtain a first weight matrix and a second weight matrix, the first weight matrix comprising a first layer of parameters of a first transformer model, the second weight matrix comprising a second layer of parameters of a second transformer model, different from the first transformer model, the first transformer model and the second transformer model comprising a same number of layers and a same number of parameters, the first layer and the second layer associated with a same layer index;
map the first weight matrix to a first point on a curved manifold;
map the second weight matrix to a second point on the curved manifold;
generate a first optimized weight matrix by performing a first manifold-constrained optimization to determine a first merge point on a first tangent space of the curved manifold, wherein the first point minimizes a first total distance from the first merge point to the first point and the second point and preserves domain-specific features of the first transformer model and the second transformer model, wherein the first merge point corresponds to the first optimized weight matrix, and the first manifold-constrained optimization comprises iteratively updating a candidate merge point towards the first merge point; and
generate a first merged transformer model of the first transformer model and the second transformer model by mapping the first optimized weight matrix to a first merged layer of parameters of the first merged transformer model, the first merged layer associated with the same layer index.

9. The processing system of claim 8, wherein:
the first transformer model has been fine-tuned for a first knowledge domain,
the second transformer model has been fine-tuned for a second knowledge domain, and
the first knowledge domain and the second knowledge domain are different.

10. The processing system of claim 8, wherein the one or more processors are further configured to cause the processing system to:
normalize the first weight matrix and the second weight matrix to generate a first normalized weight matrix and a second normalized weight matrix,
wherein:
to cause the processing system to map the first weight matrix to the first point on the curved manifold, the one or more processors are configured to cause the processing system to map the first normalized weight matrix to the first point on the curved manifold, and
to cause the processing system to map the second weight matrix to the second point on the curved manifold, the one or more processors are configured to cause the processing system to map the second normalized weight matrix to the second point on the curved manifold.

11. The processing system of claim 8, wherein to cause the processing system to determine the first merge point on the first tangent space of the curved manifold, the one or more processors are configured to cause the processing system to determine a Riemannian barycenter between the first point and the second point.

12. The processing system of claim 8, wherein the first manifold-constrained optimization further comprises an application of a bias factor to the first total distance, the bias factor indicative of how close the first merge point is to the first point or the second point.

13. The processing system of claim 12, wherein the one or more processors are further configured to cause the processing system to:
for each respective candidate bias factor of a plurality of candidate bias factors:
apply the respective candidate bias factor to the first total distance for the first manifold-constrained optimization; and after applying the respective candidate bias factor to the first total distance, determine an accuracy of the first merged transformer model using an evaluation dataset; and determine the bias factor by identifying a candidate bias factor of the plurality of candidate bias factors associated with a highest accuracy of the first merged transformer model using the evaluation dataset.

14. The processing system of claim 8, wherein the one or more processors are further configured to cause the processing system to:

obtain a third weight matrix and a fourth weight matrix, the third weight matrix comprising a third layer of parameters of the first merged transformer model, the fourth weight matrix comprising a fourth layer of parameters of a third transformer model, different from the first transformer model, the second transformer model, and the first merged transformer model, the first merged transformer model and the third transformer model comprising the same number of layers and the same number of parameters;

map the third weight matrix to a third point on the curved manifold;

map the fourth weight matrix to a fourth point on the curved manifold;

generate a second optimized weight matrix by performing a second manifold-constrained optimization to determine a second merge point on a second tangent space of the curved manifold, wherein the second merge point minimizes a second total distance from the second merge point to the third point and the fourth point and preserves domain-specific features of the first merged transformer model and the third transformer model, wherein the second merge point corresponds to the second optimized weight matrix, and the second manifold-constrained optimization comprises iteratively updating another candidate merge point towards the second merge point; and generate a second merged transformer model of the first merged transformer model and the third transformer model by mapping the second optimized weight matrix to a second merged layer of parameters of the second merged transformer model.

15. A method, comprising:

obtaining a first weight matrix, a second weight matrix, and a third weight matrix, the first weight matrix comprising a first layer of parameters of a first transformer model, the second weight matrix comprising a second layer of parameters of a second transformer model, different from the first transformer model, the third weight matrix comprising a third layer of parameters of a third transformer model, different from the first transformer model and the second transformer model, wherein the first transformer model, the second transformer model, and the third transformer model comprise a same number of layers and a same number of parameters, wherein the first layer, the second layer, and the third layer are associated with a same layer index;

mapping the first weight matrix to a first point on a curved manifold;

mapping the second weight matrix to a second point on the curved manifold;

mapping the third weight matrix to a third point on the curved manifold;

generating a first optimized weight matrix by performing a first manifold-constrained optimization for determining a first merge point on a first tangent space of the curved manifold that minimizes a first total distance from the first merge point to the first point, the second point, and the third point, and preserves domain-specific features of the first transformer model, the second transformer model, and the third transformer model, wherein the first merge point corresponds to the first optimized weight matrix, and the first manifold-constrained optimization comprises iteratively updating a candidate merge point towards the first merge point; and generating a first merged transformer model of the first transformer model, the second transformer model, and the third transformer model by mapping the first optimized weight matrix to a first merged layer of parameters of the first merged transformer model, the first merged layer associated with the same layer index.

16. The method of claim 15, wherein:

the first transformer model has been fine-tuned for a first knowledge domain, the second transformer model has been fine-tuned for a second knowledge domain, the third transformer model has been fine-tuned for a third knowledge domain, and the first knowledge domain, the second knowledge domain, and the third knowledge domain are different from one another.

17. The method of claim 15, further comprising:

normalizing the first weight matrix, the second weight matrix, and the third weight matrix to generate a first normalized weight matrix, a second normalized weight matrix, and a third normalized weight matrix, wherein:

mapping the first weight matrix to the first point on the curved manifold comprises mapping the first normalized weight matrix to the first point on the curved manifold, mapping the second weight matrix to the second point on the curved manifold comprises mapping the second normalized weight matrix to the second point on the curved manifold, and mapping the third weight matrix to the third point on the curved manifold comprises mapping the third normalized weight matrix to the third point on the curved manifold.

18. The method of claim 15, wherein determining the first merge point on the first tangent space of the curved manifold comprises determining a Riemannian barycenter between the first point, the second point, and the third point.

19. The method of claim 15, wherein the first manifold-constrained optimization further comprises applying a bias factor to the first total distance, the bias factor indicative of how close the first merge point is to the first point, the second point, or the third point.

20. The method of claim 19, further comprising:

for each respective candidate bias factor of a plurality of candidate bias factors:

applying the respective candidate bias factor to the first total distance for the first manifold-constrained optimization; and after applying the respective candidate bias factor to the first total distance, determining an accuracy of the first merged transformer model using an evaluation dataset; and determining the bias factor by identifying a candidate bias factor of the plurality of candidate bias factors associated with a highest accuracy of the first merged transformer model using the evaluation dataset.

* * * * *